US010693802B2

United States Patent
Weber et al.

(10) Patent No.: US 10,693,802 B2
(45) Date of Patent: *Jun. 23, 2020

(54) SYSTEMS AND METHODS FOR PROVISIONING AND MANAGING AN ELASTIC COMPUTING INFRASTRUCTURE

(71) Applicant: Sea Street Technologies, Inc., Canton, MA (US)

(72) Inventors: John Weber, New Ipswich, NH (US); Harley L. Stowell, III, Manchester, MA (US)

(73) Assignee: SEA STREET TECHNOLOGIES, INC., Canton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,503

(22) Filed: Sep. 11, 2017

(65) Prior Publication Data
US 2018/0219792 A1    Aug. 2, 2018

Related U.S. Application Data

(63) Continuation of application No. 14/072,024, filed on Nov. 5, 2013, now Pat. No. 9,762,503.
(Continued)

(51) Int. Cl.
*G06F 15/173* (2006.01)
*H04L 12/911* (2013.01)

(52) U.S. Cl.
CPC ............ *H04L 47/70* (2013.01); *H04L 47/823* (2013.01); *H04L 47/822* (2013.01)

(58) Field of Classification Search
CPC ... H04L 12/26; H04L 12/911; H04L 12/2858; H04L 12/5695; H04L 29/06;
(Continued)

(56) References Cited

U.S. PATENT DOCUMENTS

| 8,244,874 B1 | 8/2012 | Thibeault |
| 2003/0120502 A1 | 6/2003 | Robb |

(Continued)

FOREIGN PATENT DOCUMENTS

| WO | 2010127365 A1 | 11/2010 |
| WO | 2011071850 A2 | 6/2011 |

OTHER PUBLICATIONS

Extended European Search Report for European Application No. 13851704.0, dated Jun. 20, 2016, 7 pages.
(Continued)

*Primary Examiner* — Farzana B Huq
(74) *Attorney, Agent, or Firm* — Finch & Maloney PLLC

(57) ABSTRACT

A system for provisioning an elastic computing infrastructure is provided. The system include a memory and at least one processor coupled to the memory. The system also includes a management component executed by the at least one processor and configured to instantiate an objective object having a resource collection and instructions that specify processing performed by the objective object, the resource collection identifying at least one resource object that controls a capacity of at least one resource provided by at least one computer system, the capacity being sufficient for processing to be performed at a predetermined performance level.

18 Claims, 20 Drawing Sheets

Related U.S. Application Data

(60) Provisional application No. 61/722,429, filed on Nov. 5, 2012.

(58) Field of Classification Search
CPC .......... H04L 29/06027; H04L 41/0896; H04L 41/5009; H04L 41/5022; H04L 41/5051; H04L 47/10; H04L 47/20; H04L 47/70; H04L 47/76; H04L 47/78; H04L 47/805; H04L 47/2408; H04L 67/10; H04L 67/38
USPC .......... 709/220, 223, 224, 226, 231
See application file for complete search history.

(56) References Cited

U.S. PATENT DOCUMENTS

| | | |
|---|---|---|
| 2010/0131592 A1 | 5/2010 | Zhang |
| 2011/0022812 A1 | 1/2011 | Van Der Linden et al. |
| 2011/0258317 A1 | 10/2011 | Sinha et al. |
| 2011/0258320 A1 | 10/2011 | Jackson |
| 2012/0124204 A1 | 5/2012 | Robb et al. |
| 2012/0151078 A1 | 6/2012 | Puthenpura |
| 2012/0240110 A1 | 9/2012 | Breitgand |
| 2012/0260019 A1* | 10/2012 | Malaiyandisamy .. G06F 9/5077 711/6 |
| 2012/0278578 A1 | 11/2012 | Castillo et al. |
| 2013/0014107 A1* | 1/2013 | Kirchhofer .......... G06F 9/5083 718/1 |
| 2013/0138816 A1 | 5/2013 | Kuo |

OTHER PUBLICATIONS

Chapman et al., "Elastic Service Management in Computational Clouds", Cloudman 2010, IEEE/IFIP, Osaka, Japan, Apr. 1-23, 2010, [Retrieved Apr. 3, 2014]. Retrieved from the internet: <http://www.researchgate.net/publication/224146278_Elastic_service_definition_in_computational_clouds/file/d912f51e1ffe723ce.pdf>, 2 pages.

Doyle et al., "Model-Based Resource Provisioning in a Web Service Utility", Proceedings of the 4th Conference on USENIX Symposium on Internet Technologies and Systems, vol. 4, pp. 5-5, 2003, [Retrieved Apr. 3, 2014] Retrieved from the internet: <http://ftp.csd.uwo.ca/courses/CS9843b/papers/model_paper.pdf>, 14 pages.

International Search Report from corresponding PCT Application No. PCT/US13/68466 dated May 12, 2014 in A2168-7000WO, 10 pages.

Australian Exam report for Patent application 2018217316 dated Oct. 15, 2019, 3pgs.

* cited by examiner

SYSTEMS AND METHODS FOR PROVISIONING AND MANAGING AN ELASTIC COMPUTING INFRASTRUCTURE

RELATED APPLICATIONS

This application claims the benefit under 35 U.S.C. § 120 as a continuation of U.S. application Ser. No. 14/072,024, titled "SYSTEMS AND METHODS FOR PROVISIONING AND MANAGING AN ELASTIC COMPUTING INFRASTRUCTURE", filed on Nov. 5, 2013, which claims priority under 35 U.S.C. § 119(e) to U.S. Provisional Application Ser. No. 61/722,429, titled "SYSTEMS AND METHODS OF PROVISIONING AN ELASTIC COMPUTING INFRASTRUCTURE," filed on Nov. 5, 2012, which is hereby incorporated herein by reference in its entirety.

BACKGROUND

Technical Field

The technical field relates generally to management of computing resources and, more particularly, to systems and methods that manage physical and virtual resources, such as compute, network, and storage resources.

Background Discussion

The information systems industry has developed a variety of tools for monitoring and managing physical and virtual resources. Examples of these tools include hypervisors, storage management tools, and network management tools. Hypervisors virtualize (i.e., introduce a layer of abstraction to and provide standardized interfaces between) the physical hardware of a computer and one or more software components executed by the computer. Storage management tools virtualize physical data storage for use by the software components. Network management tools virtualize physical and logical network recourses (e.g., routers, switches, VLANs, etc.) that provide network bandwidth for use by the software components. When each of these is monitoring and management tools properly installed, configured, and administered, each provides a portion of the computing resources needed for the execution of software components.

SUMMARY

Some aspects disclosed herein provide one or more facilities for coordinating physical and virtual resources to provide an elastic computing infrastructure. Within the elastic computing infrastructure, these physical and virtual resources (e.g., compute, network, and storage resources) are managed as a single system. The elastic computing infrastructure may adjust (e.g., grow or contract) virtual resources provided to the software components over time as a function of any combination of a variety of factors. Examples of the factors include policies that govern the allocation of the virtual resources, the amount of virtual computing resource available to the elastic computing infrastructure, and the demand for those resources as requested by software components being executed by the infrastructure. These policies may address both technical operations (e.g., ensuring that components execute processes at a predefined level of performance) and business operations (e.g., ensuring that operational costs are controlled or that increases in operational costs are offset by proportional increases in revenue).

According to other aspects, the facilities manage virtual resources using an object model that implements virtual resources as object instances of a resource class or a subclass thereof. These resource objects may include a common set of properties and methods and may expose a set of common interfaces. This set of common interfaces may include interfaces that are configured to receive and response to discovery requests for additional information regarding interfaces exposed by the resource object. The set of common interfaces may also include interfaces that enable resource objects to reference and interoperate with other resource objects.

In accord with some aspects, the set of common interfaces enables the elastic computing infrastructure to be both vertically and horizontally extensible. As referred to herein, extensibility refers to the elastic computing infrastructure's ability to dynamically add additional predefined virtual resources and to dynamically define and add new types of virtual resources. Vertical extensibility refers to the ability to add virtual resources that build upon other, previously established virtual resources. Horizontal extensibility refers to the ability to add new types of virtual resources. These additional virtual resources may belong to an existing domain or may belong to a new and distinct domain. As referred to herein, a domain is a set of virtual resources that share common resource functionality (e.g. compute functionality, storage functionality, network functionality, etc.).

In other aspects, the facilities model the virtual resources available via the elastic computing infrastructure, the physical computing resources that implement the virtual resources, and the processing demands that may be placed on both. In this way, changes to the elastic computing infrastructure can be simulated and analyzed without actual deployment of the changes, thereby allowing users to debug particular configurations in a non-disruptive manner. The facilities may also utilize the model to identify failures in the physical and virtual resources underlying the elastic computing infrastructure. These identified physical and virtual computing resource failures may be traced horizontally and vertically to identify processes and customers affected by the failure.

According to one embodiment, a method for provisioning an elastic computing infrastructure is provided. The method includes acts of instantiating an objective object having a resource collection and instructions that specify processing performed by the objective object, the resource collection identifying at least one resource object that controls a capacity of at least one resource provided by at least one computer system, the capacity being sufficient for the processing to be performed at a predetermined performance level.

In the method, the act of instantiating the objective object may include an act of instantiating an objective object having a resource collection identifying a plurality of resource objects belonging to one or more domains and having a common set of properties and methods. The method may further include an act of instantiating a new resource object of a domain other than the storage domain, the network domain, and the compute domain. In some embodiments, the act of instantiating the new resource object may invoke a method common to the class defining the new object and classes defining objects from another domain, such as the storage domain, the network domain, and the compute domain.

According to another embodiment, a method for managing the operation of objectives executing within an elastic computing infrastructure is provided. The method includes acts of instantiating a rule object associated with one or more objective objects, determining that the rule object corresponds to an injection point within one or more objective objects, and injecting the rule object into the one or more objective objects. In the method, the injected rule object may modify the operation of the objective at the injection point via instructions included in the rule object.

According to another embodiment, a provisioning and management system is provided. The system includes a memory, at least one processor coupled to the memory, and a management component executed by the at least one processor. The management component is configured to instantiate an objective object having a resource collection and instructions that specify processing performed by the objective object, the resource collection identifying at least one resource object that controls a capacity of at least one resource provided by at least one computer system, the capacity being sufficient for processing to be performed at a predetermined performance level. The objective object and the plurality of resource objects may be instances of descendants of a resource type class.

In the provisioning and management system, the at least one resource object may include a plurality of resource objects belonging to a domain and having a common set of properties and methods. The domain may include at least one of a storage domain, a network domain, and a compute domain. The at least one resource may include at least one network resource, at least one storage resource, and at least one compute resource.

The management component may be further configured to instantiate a new resource object of a domain other than the storage domain, the network domain, and the compute domain. The new resource object may expose an interface through which other objects discover at least one of a new method and a new property.

The management component may be further configured to instantiate a new objective object having a new resource collection including the objective object. The management component may e further configured to model execution of the new objective object without instantiating the new objective object. The new objective object may include a transcoder objective.

In the provisioning and management system, the objective object may include an elastic service objective object having properties specifying the capacity. The elastic service objective object may be configured to adjust the capacity in response to a change in the properties. The elastic service objective object may be configured to adjust the capacity by executing at least one of a grow method and a contract method.

In the provisioning and management system, the elastic service objective object may be configured to adjust by the capacity in increments of logical resource units. The at least one resource object may be configured to adjust the capacity in increments of actual capacity determined as a function of the logical resource units.

In the provisioning and management system, the management component may be further configured to identify one or more components of the at least one computer system involved in providing the at least one resource as controlled by the at least one resource object.

In the provisioning and management system, the instructions may include instructions to execute at least one of an objective create method, an objective realize method, an objective notify method, an objective measure method, an objective repair method, an objective unrealize method, and an objective destroy method. The objective measure method may be configured to collect metrics related to the objective object and provide the metrics to the management component. The metrics may include information descriptive of a process supported by the objective object. For instance, this process information may include data provided by instrumentation of a user mode process executing within a virtual machine provided via the objective object. The service information may also include transaction files, log files or other information that is produced due to execution of the user mode process or information determined via programmatic interaction between the measure method of the objective object and the user mode application.

In the provisioning and management system, the management component may be further configured to determine that the objective object is not performing at the predetermined performance level (e.g., a process supported by the objective object is not performing at the predetermined performance level) and adjust the capacity.

In the provisioning and management system, the at least one computer system may include a computer system that has failed and the management component may be configured to determine that the objective object is not performing at the predetermined performance level by detecting the computer system has failed.

According to another embodiment, a method for provisioning and managing an elastic computing infrastructure is provided. The method includes acts of instantiating an objective object having a resource collection and instructions that specify processing performed by the objective object, the resource collection identifying at least one resource object that controls a capacity of at least one resource provided by at least one computer system, the capacity being sufficient for processing to be performed at a predetermined performance level.

In the method, the act of instantiating the objective object may include an act of instantiating an objective object having a resource collection identifying a plurality of resource objects belonging to a domain and having a common set of properties and methods. The act of instantiating the objective object may include an act of instantiating an objective object having a resource collection identifying a plurality of resource objects belonging to a domain that includes at least one of a storage domain, a network domain, and a compute domain.

The method may further include an act of instantiating a new resource object of a domain other than the storage domain, the network domain, and the compute domain. The act of instantiating the new resource object may include an act of instantiating a new resource object that exposes an interface through which other objects discover at least one of a new method and a new property. The act of instantiating the objective object may include an act of instantiating an objective object that is a descendant of a resource type class and that has a resource collection identifying a plurality of resource objects that are descendants of the resource type class.

The method may further include an act of instantiating a new objective object having a new resource collection including the objective object. The method may further include an act of modeling execution of the new objective object without instantiating the new objective object.

In the method, the act of instantiating the objective object may include an act of instantiating an elastic service objective object having properties specifying the capacity. The act of instantiating the elastic service objective object may include an act of instantiating an elastic service objective object that is configured to adjust the capacity in response to a change in the properties. The act of instantiating the objective object may include an act of instantiating an objective object having a resource collection identifying at least one resource object that controls a capacity of at least one resource that includes at least one network resource, at least one storage resource, and at least one compute resource. The act of instantiating the elastic service objective object may include an act of instantiating an elastic service objective object that adjusts the capacity by executing at least one of a grow method and a contract method. The act of instantiating the elastic service objective object may include an act of instantiating an elastic service objective object that adjusts the capacity in increments of logical resource units. The act of instantiating the elastic service objective object may include an act of instantiating an elastic service objective object that adjusts the capacity in increments of actual capacity determined as a function of the logical resource units. The act of instantiating the new objective object may include an act of instantiating a transcoder objective.

The method may further include an act of identifying one or more components of the at least one computer system involved in providing the at least one resource as controlled by the at least one resource object. The act of instantiating the objective object may include an act of instantiating an objective object having instructions to execute at least one of an objective create method, an objective realize method, an objective notify method, an objective measure method, an objective repair method, an objective unrealize method, and an objective destroy method. The act of instantiating the objective object may include an act of instantiating an objective object having instructions to execute an objective measure method that collects metrics related to the objective object and provides the metrics to a management component.

The method may further comprise acts of determining that the objective object is not performing at the predetermined performance level; and adjusting the capacity. In the method, the at least one computer system may include a computer system that has failed and the act of determining that the objective object is not performing at the predetermined performance level may include an act of detecting the computer system has failed.

According to another embodiment, a non-transitory computer readable medium is provided. The non-transitory computer readable medium stores computer executable instructions for provisioning and managing an elastic computing infrastructure. The computer executable instructions including instructions that instruct at least one processor to instantiate an objective object having a resource collection and instructions that specify processing performed by the objective object, the resource collection identifying at least one resource object that controls a capacity of at least one resource provided by at least one computer system, the capacity being sufficient for processing to be performed at a predetermined performance level.

The instructions to instantiate the objective object may include instructions to instantiate an objective object having a resource collection identifying a plurality of resource objects belonging to a domain and having a common set of properties and methods. The instructions to instantiate the objective object may include instructions to instantiate an objective object having a resource collection identifying a plurality of resource objects belonging to a domain that includes at least one of a storage domain, a network domain, and a compute domain. The instructions may further instruct the at least one processor to instantiate a new resource object of a domain other than the storage domain, the network domain, and the compute domain. The instructions to instantiate the new resource object may include instructions to instantiate a new resource object that exposes an interface through which other objects discover at least one of a new method and a new property. The instructions to instantiate the objective object may include instructions to instantiate an objective object that is a descendant of a resource type class and that has a resource collection identifying a plurality of resource objects that are descendants of the resource type class.

The instructions may further instruct the at least one processor to instantiate a new objective object having a new resource collection including the objective object. The instructions may further instruct the at least one processor to model execution of the new objective object without instantiating the new objective object. The instructions to instantiate the objective object may include instructions to instantiate an elastic service objective object having properties specifying the capacity. The instructions to instantiate the elastic service objective object may include instructions to instantiate an elastic service objective object that is configured to adjust the capacity in response to a change in the properties. The instructions to instantiate the objective object may include instructions to instantiate an objective object having a resource collection identifying at least one resource object that controls a capacity of at least one resource that includes at least one network resource, at least one storage resource, and at least one compute resource. The instructions to instantiate the elastic service objective object may include instructions to instantiate an elastic service objective object that adjusts the capacity by executing at least one of a grow method and a contract method. The instructions to instantiate the elastic service objective object may include instructions to instantiate an elastic service objective object that adjusts the capacity in increments of logical resource units. The instructions to instantiate the elastic service objective object may include instructions to instantiate an elastic service objective object that adjusts the capacity in increments of actual capacity determined as a function of the logical resource units. The instructions to instantiate the new objective object may include instructions to instantiate a transcoder objective.

The instructions may further instruct the at least one processor to identify one or more components of the at least one computer system involved in providing the at least one resource as controlled by the at least one resource object. The instructions to instantiate the objective object may include instructions to instantiate an objective object having instructions to execute at least one of an objective create method, an objective realize method, an objective notify method, an objective measure method, an objective repair method, an objective unrealize method, and an objective destroy method. The instructions to instantiate the objective object may include instructions to instantiate an objective object having instructions to execute an objective measure method that collects metrics related to the objective object and provides the metrics to a management component.

The instructions may further instruct the at least one processor to determine that the objective object is not performing at the predetermined performance level and adjust the capacity. The at least one computer system may include a computer system that has failed and the instructions to determine that the objective object is not performing at the predetermined performance level may include instructions to detect whether the computer system has failed.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
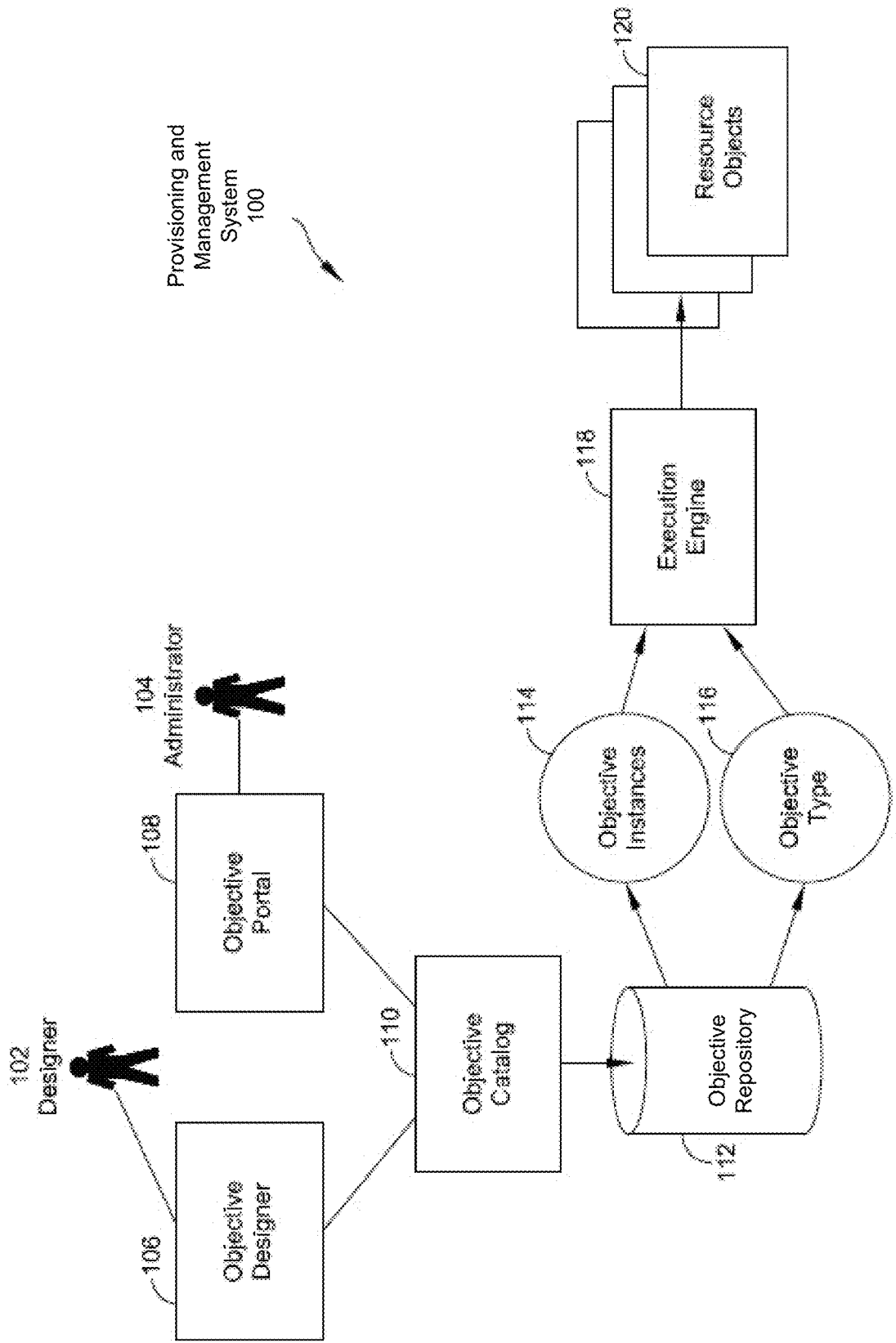
FIG. 1 is a context diagram including an example system for provisioning and managing an elastic computing infrastructure.

Some embodiments disclosed herein include apparatus and processes for designing, provisioning, and managing one or more elastic computing infrastructures, such as the elastic computing infrastructure 800 described further below. For example, according to one embodiment, a provisioning and management system presents interfaces through which the provisioning and management system receives information descriptive of the physical and virtual resources that constitute the elastic computing infrastructure. These physical and virtual resources may include virtual compute resources (e.g., virtual processors and virtual memory), virtual network resources (e.g., VLANs), and virtual storage resources (e.g., virtual storage arrays). The interfaces may also receive information descriptive of processes to be performed by the elastic computing infrastructure. In some embodiments, the provisioning and management system uses the information received to model, implement, and monitor the elastic computing infrastructure.

It is appreciated that, in some embodiments, the provisioning and management system unifies virtual compute resources, virtual network resources, and virtual storage resources into a common system model. Further, it is appreciated that the provisioning and management system not only provisions these virtual resources, but also manages lifecycle elastic operations (process execution, process termination, process modeling, process diagnostics/troubleshooting, process recovery, etc.) based on configurable policies as described herein. In some embodiments, objective objects implement policies that are financially or operationally focused. These objective objects constitute a controlling layer of logic within the provisioning and management system that governs the elastic computing infrastructure. It is appreciated that this process hierarchy (e.g., hierarchy of objective objects) enables some embodiments disclosed herein to not only control operation of components implemented within the elastic computing infrastructure but also control the business ramifications of executing and scaling these components.

Some embodiments are directed to cloud computing systems. In these embodiments, the design of the provisioning and management system offers unique characteristics that enhance the provisioning and management system's ability, within the infrastructure, to effectively describe and manage provisioned services and to readily accommodate enhanced and evolving technologies.

In one embodiment, the provisioning and management system features a common object model that consistently describes physical and virtual resources both within and across technology domains. The model presents standard resource syntax across all domains and defines consistent semantics within a domain. This benefits consumers of the model since they can interact with resources using a standard syntax without requiring knowledge of the underlying semantics of an object.

Some embodiments include an integrated virtual resource referred to herein as an "objective." Objectives, which inherit characteristics from the common object model, may represent a combination of one or more physical or virtual resources that implement a service. In at least one embodiment, the objective class is a subclass of the resource class, and therefore is itself a type of resource. As described further below, a service is a higher layer abstraction that includes information descriptive of the application-specific processes and semantics used to orchestrate constituent virtual and physical resources. An objective is self-describing, includes configurable parameters, and addresses specific needs of a service implementation. It is to be appreciated that objectives may themselves be long-lived, persistent resources that can be monitored and modified over their lifetimes. Some embodiments track the relationship between objectives to their constituent physical and virtual resources and measure the performance and status of an elastic computing infrastructure as a function of the performance and status of the objectives implemented by the elastic computing infrastructure and their constituent physical and virtual resources. It is to be appreciated that objectives may themselves act as constituents of higher level objectives. This self-similar trait enables designs of arbitrarily complex services to be built up of hierarchies of reusable objectives.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Elastic Computing Infrastructure Object Model

According to some embodiments, resource objects are a fundamental building block of the elastic computing infrastructure. Resource objects and their descendants allow elastic computing infrastructures to be combined in a determined fashion to build more complex, integrated systems.

Types of system resources are typically organized into domains that share common roles and basic capabilities within an elastic computing infrastructure. Resource domains would include, but not necessarily be limited to, virtual compute resources (e.g., hypervisors), dynamic mass storage, networking infrastructure, operational monitoring, and the like. In some embodiments, resource domains are represented within a provisioning and management system, such as the provisioning and management system 100 described further below, as instantiated domain objects that include collections of resource objects.

In some embodiments, the provisioning and management system interacts with resources through one or more interfaces exposed by resource managers. Resource managers are software components external to the provisioning and management system. Resource managers enable the provisioning and management system to create, modify, and monitor resources within a domain. The form and function of interfaces exposed by resource manager is defined by, and may be specific to, the resource manager implementation.

According to some implementations, resource managers expose event-driven, request-response interfaces and await requests to allocate resources. In these implementations, resource managers respond to allocation requests by validating the request and executing the request to allocate the resources according to the request. Example validation processes include determining whether the allocation request is valid, determining whether the external system or user making the request is authorized to do so, determining whether sufficient resources are available to partially or completely service the request, and the like. As explained further below, in some embodiments, validation process may be executed by rule objects executing within the elastic computing infrastructure.

Figure 4:
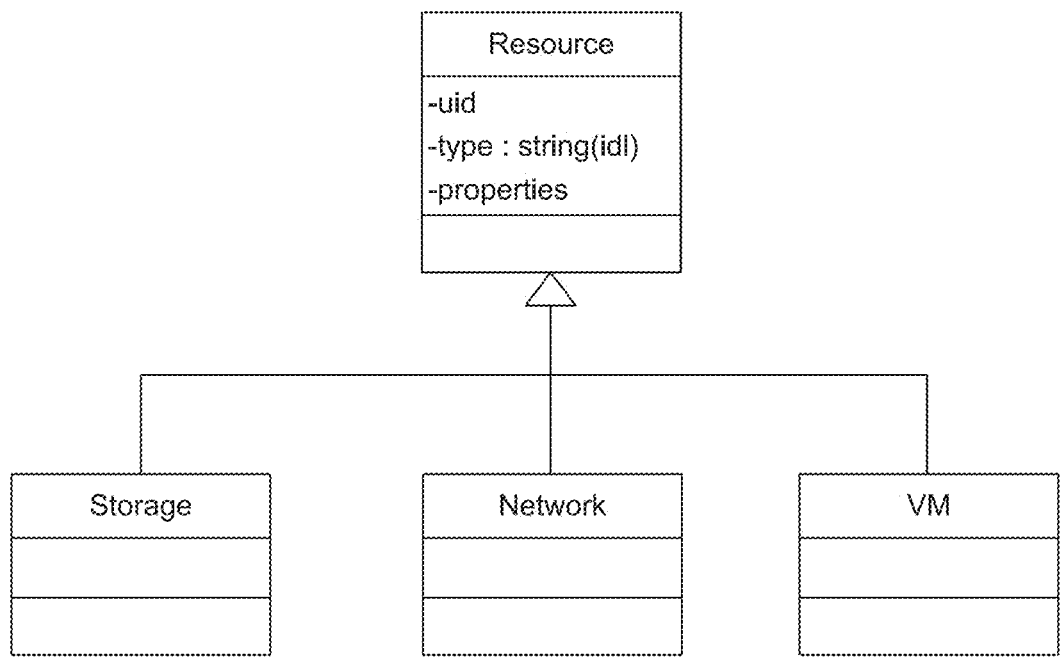
FIG. 4 is an object model diagram illustrating an example resource class and example domains based thereon.

In some embodiments, to interoperate with resource manager interfaces, the provisioning and management system defines a common basic representation independent of resource type or capability. This representation defines the base of a common object model utilized by components of the provisioning and management system. FIG. 4 illustrates one example of this basic representation, a resource class. The resource class defines a common set of interfaces, properties, and methods shared by instantiated resource objects. For example, in some embodiments, the resource class may define a discovery interface through which other objects may discover existing or newly created (e.g., at runtime) properties and methods. In one embodiment, a resource object responds to a call to their discovery interface with an enumerated list of properties, methods, and interfaces that the calling object may use to interact with the object. To determine the contents of the enumerated list, the resource object may inject a rule object that identifies an access level for the calling object. The resource object may use the access level identified by the rule object to determine the contents of the enumerated list.

Descendants of the resource class shown may include resource objects belonging to the storage, network, and compute domains. As shown in FIG. 4, the resource class includes a UID, a type, and additional properties.

As illustrated in FIG. 4, the UID is a unique identifier associated with each resource as an immutable handle for referencing the resource. In some embodiments, every instance of a resource in the common object model has a UID to distinguish it uniquely from all other resource instances. The type of a resource identifies a group of resources to which the resource belongs and with which the resource shares common functional characteristics. Resource types are described further below with reference to FIG. 6. The additional properties of a resource class are a set of name, value pairs that further define the resource.

Resource properties are a primary mechanism through which a resource client may interact with the resource. Setting or modifying resource properties affects the state of the resource and can cause the resource manager to take specific actions based on the state change. The set of properties and their semantics is the basic mechanism for defining a specific resource type within the provisioning and management system and the elastic computing infrastructure.

Figure 7:
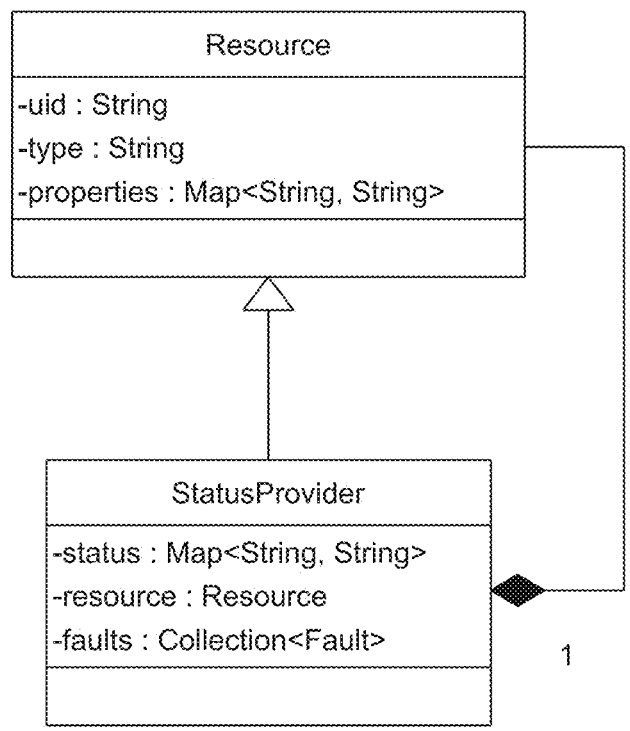
FIG. 7 is an object model diagram illustrating an example resource class and an example status provider class based thereon.

A resource may expose information regarding its status using a variety of techniques. For instance, according to one embodiment, resources expose specific status related property values. Status properties are distinct from other resource properties in that they are read-only and communicate a value related to the status of the resource. The value of a status property may change over time with the state of the resource. In another embodiment, resources expose status information by reporting faults to the provisioning and management system. Faults may include detailed descriptions of problems related to the operation of the resource. Resource objects can present faults unique to that object or derived from any constituent objects that make up that resource. According to some embodiments, faults are ephemeral objects since they relate strictly to the operational status of the resource at the time they are accessed. As the operational state of a resource changes, the faults associated with the resource may adjust accordingly. Since not all resources may report status information, FIG. 7 illustrates status information a decorator of the resource base class. As shown in FIG. 7, the StatusProvider decorator includes an identifier of the resource to which it applies, a collection of faults, and a set (map) of name, value pairs.

According to the embodiment illustrated in FIG. 4, each resource is of a resource type specified by its type string. The type string may consist of multiple parts and may utilize dotted notation for indicating specialization of more generic resource types. In some embodiments, resource objects are an instance of a resource type class. For example, a resource representing a virtual machine may be specified with the type "resource.vm" while a resource representing a VLAN to which the virtual machine is attached to would be of the type "resource.vlan." In these embodiments, the type of the resource indicates explicitly what the resource object represents and how it is to be interpreted. It is to be appreciated that a resource type may be specialized into a resource type subclass. For example, resource.vm could be extended to a new resource type named resource.vm.vmware. In this example, as indicated by its name, the resource.vm.vmware subclass includes the properties of the resource.vm class plus additional properties specific to the features of the vmware resource manager.

According to some embodiments, a resource type specifies a set of properties specific to that resource type. In these embodiments, the semantics of a resource are fully defined by its resource type, properties, and property types. Further, in these embodiments, properties are a collection of strongly typed name, value pairs that define values associated with the properties of a resource type. The name, value pairs may indicate how the property value is interpreted. For example, a resource of type "resource.vlan" may specify a VLAN number, subnet, and gateway address as some of its properties. The corresponding property names may be number, subnet, and gateway. The associated property types may be integer.vlanno, ipaddress, and ipaddress. Note that, in at least one embodiment property types follow the same hierarchical type conventions as resource types. For example, a VLAN number is restricted to positive integers, so the VLAN resource's number property can be further qualified to indicate that behavior. Updating the subnet property value would have the effect of changing how the network address for that VLAN is provisioned in the system.

According to another example, a resource of type "resource.domain.windows2008" may specify a forest domain, a forest functional level, a NetBIOS name, DNS server, and ActiveDirectoryStructure as some of its properties. The corresponding property names may be FQDN (fully qualified domain name), OSLevel (operating system level), NetBIOS name, DNS server, ActiveDirectoryObject. The associated property types may be string.FQDN, string.OSLevel, string.NetBIOS name, boolean, and resource.ActiveDirectoryObject. Updating the value of the ActiveDirectoryStructure property may have the effect of changing the compute and storage resources accessible within a windows network domain provisioned in the system.

In some embodiments, the resource types defined within a domain exist within the elastic computing infrastructure as object instances that are discoverable via an objective repository, such as the objective repository 112 described further below, or via an execution engine, such as the execution engine 118 described further below. A resource type description which identifies the resource type and the properties defined by that resource type may be queried by components of the system in order to learn the resource type semantics of resources within the domain.

In some embodiments, the provisioning and management system defines basic capabilities for resource domains significant to the overall operation of the elastic computing infrastructure by specifying the resource types to be supported within a given domain that is required to execute an integrated cloud system function. This allows components of the provisioning and management system and the elastic computing infrastructure to rely on a defined set of minimum capabilities for resources of a given domain through the common object model. As such, access to resource capabilities through the common object model may be independent of the particular hardware and software implementation provided by the resource manager. Within these embodiments, well defined basic domain capabilities also enable delegation of complex tasks across and between domains without regard for the domain's implementation.

For example, a common virtual machine (VM) resource manager may define resource types for VM instances which include properties for image, memory size, CPU capacity, attached storage, etc. Another resource type would be a VM image. In this example, a resource object that supports the VM common model would support these types and their standard properties.

Specific resource manager and resource object implementations may extend the basic capabilities prescribed by the provisioning and management system by extending the basic type definitions or adding additional resource types. In this way, the provisioning and management system may expose resource manager implementation specific capabilities and resources within a resource domain without compromising support for and access to basic domain capabilities. As domain implementations extend the definition of standard capabilities over time, common extensions will become adopted into the standard resource objects for the domain.

According to some embodiments, objectives represent and include a set, or collection, of resources and business logic configured to implement a particular capability within the elastic computing infrastructure. The business logic may be encoded as interpretable or executable instructions. In these embodiments, an objective defines the manner in which resources are created, related, and maintained in support of a specific business purpose. In other words, in these embodiments, the objective defines business logic that specifies not only which resources it aggregates as part of its implementation, but also the manner in which these resources are constructed and managed on an ongoing basis. This logic can be arbitrarily complex as required by the design and implementation of the objective.

Figure 5:
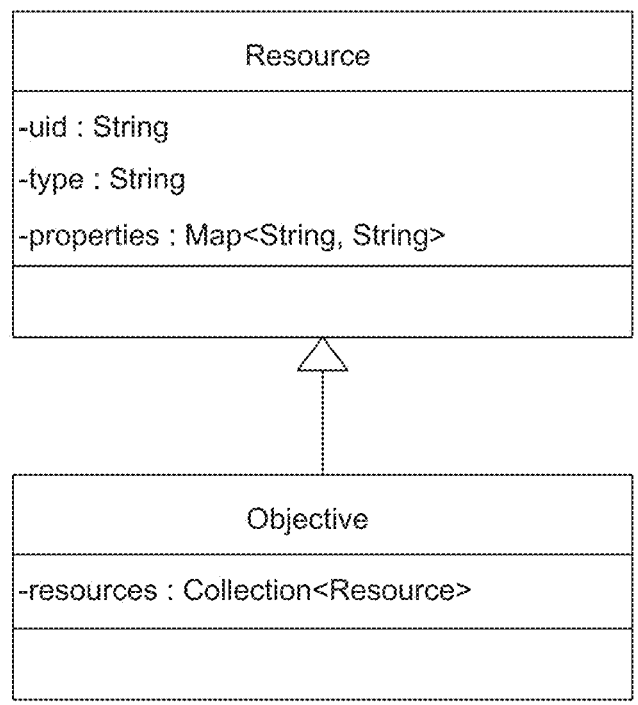
FIG. 5 is an object model diagram illustrating an example resource class and an example objective class based thereon.

As illustrated in FIG. 5, in some embodiments, objectives are represented as resources in the common model, so an objective may be a constituent resource in a higher level objective. As resources, objectives also have a type and discoverable type definition. Thus designers may build up progressively higher abstraction layers on the basic resource types to construct complex systems that hide detail at the up-most layers while still providing a high level of control and access at the basic resource level. In these embodiments, the use of objectives enables the elastic computing infrastructure to both automate and orchestrate workloads across resource types while integrating business logic controls or policies.

In some embodiments, an objective type is a representation of the specific resources and interrelationships which define an objective. Additionally, objective types may encode the procedures for creating an instance of the objective, monitoring the health of the objective, and removing the constituents of the objective instance on deletion. In at least one embodiment, an objective type representation consists of a set of parameterized methods for instantiation, validation, and deletion of service instances expressed in an executable language. In this embodiment, an objective instance consists of references to constituent resources created or directly referenced by the objective type; relationships between constituent resources as defined by the objective; and current state information either as defined by the objective type or computed based on the state of constituents. Further, according to this embodiment, the definition of an objective type as an aggregation of resources and business logic can itself be represented within the system as a created object. Business logic may be encoded in standard runtime interpreted scripting or process language that can be used to define the semantics of instances of the objective.

Figure 6:
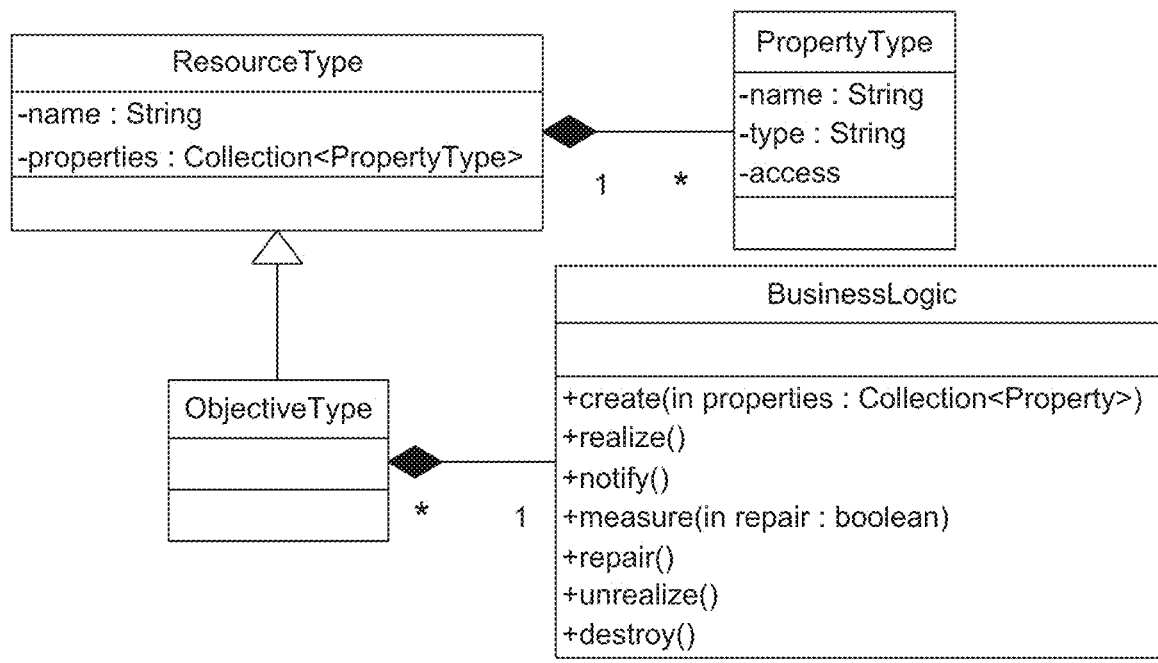
FIG. 6 is an object model diagram illustrating an example resource type class and an example objective type class based thereon.

FIG. 6 illustrates one example of an object model including a ResourceType and an ObjectiveType. As shown, the ResourceType includes a name that identifies the ResourceType and a collection of properties. Each of the properties may be associated with a PropertyType. Each PropertyType may include a name that identifies the PropertyType, a value, and an access element that specifies the mutability of the value of the property (e.g., read-only, read-write, create-only, etc.). In some embodiments, each ObjectiveType is associated with one or more sets of BusinessLogic.

In the embodiment illustrated in FIG. 6, each set of BusinessLogic implements the following methods: create, realize, notify, measure, repair, unrealize, and destroy. The create method is configured to execute an initialization process that establishes the objective within the elastic computing infrastructure and assigns values of the properties of the objective. The realize method is configured to execute an allocation process that allocates computing resources to the objective. These computing resources may be virtual or physical, implemented via one or more resource objects, and sufficient for the objective to provide its service at a baseline, default service level (i.e., a predetermined performance level). The notify method is configured to execute a process that synchronizes the objective with asynchronous events to which the object subscribes. These events may be events generated by constituents, the provisioning and management system, the elastic computing infrastructure, or any other component external to the objective to which the objective has subscribed for event notifications. The measure method is configured to execute a process that causes the objective to assess its performance and provide information descriptive of its performance to other objects or component of the elastic computing infrastructure or the provisioning and management system. The repair method is configured to execute a process that causes the objective to re-establish its computing resources and processes to correct one or more functional deficiencies. The unrealize method is configured to execute a process that causes the objective to de-allocate the computing resources used to support its operation. The destroy method is configured to execute a process that causes the objective to remove itself from the elastic computing infrastructure.

It is to be appreciated that each of the method described above may execute arbitrarily complex logic as defined by the designer of the objective. This logic may manage other objects executing within the provisioning and management system or elastic computing infrastructure, such as the objective portal 108, other objects executing within the elastic computing infrastructure, and constituent objects (e.g., resource objects and objective objects) of the objective executing the method.

In some embodiments, each objective instance includes references to its constituent resources, which comprise the implementation of the objective instance. These references may provide a clear causal relationship between the objective instance and the subordinate resources that implement the objective instance. Maintaining these relationships is beneficial so the elastic computing infrastructure can provide traceability from high level objectives to specific virtual and physical resources. In some embodiments, the process of realizing an objective is to cause the resources associated with that objective to be deployed/provisioned within the elastic computing infrastructure. In at least one embodiment, unrealized objectives are capable of describing to the provisioning system sufficient information about their implementation to communicate the resource and performance requirements of the objective once realized. In this way, a complex of objectives can be modeled before being realized in order to evaluate resource requirements against the capacity of the available infrastructure.

The state of an objective may change over time, so, in some embodiments, the provisioning and management system checks (via, for example a management component such as the execution engine 118) to insure correct operation. These checks may be periodic or event-driven. The process of verifying the correct operation of an objective and its constituent components is referred to herein as measuring an objective. In some embodiments, the objective type defines the specifics of how a particular objective measures itself by implementing the measure method as part of its business logic. For example, an objective measure may verify the existence of its constituent component resources in resource objects, that component properties are set as expected, that any components also meet measurements, and the like. In the event an objective measure detects a problem (e.g., the state of the objective includes fault information), it will be reported to the provisioning and management system as a fault in the objective. In some embodiments, the provisioning and management system, in turn, notifies a user by updating a status indicator of the objective within an objective portal, such as the objective portal 108 described further below.

In some embodiments, where an objective determines that problems exist in its implementation, the elastic computing infrastructure may issue a repair request to the objective to repair itself to the extent possible in order to correct the problem. In response to receipt of the repair request, the objective may execute a self repair process. The process and extent to which an objective is capable of repairing itself is defined by the semantics of the objective's repair process.

Provisioning and Management System

Various embodiments utilize one or more computer systems to provision and manage an elastic computing infrastructure. In these embodiments, a provisioning and management system enrolls virtual compute resources, virtual network resources, and virtual storage resources, among other virtual and physical resources, in a common system model and manages and orchestrates these resources as an integrated elastic utility (e.g., an elastic computing infrastructure). FIG. 1 illustrates one of these embodiments, a provisioning and management system 100. As shown, FIG. 1 includes a designer 102, an administrator 104, an objective designer 106, an objective portal 108, an objective catalog 110, an objective repository 112, objective instances 114, objective types 116, execution engine 118 and resource objects 120.

As illustrated in FIG. 1, the objective catalog 110 includes an objective repository 112 for information descriptive of objective types 116 and objective instances 114. The objective catalog 110 is configured to provide interfaces that exchange information with other system components, such as the objective designer 106 and the objective portal 108, in support of the following functionality: definition of new objective types, discovery of currently defined objective classes, creation of new instances of objective class instances, and discovery of existing instances of objectives.

In some embodiments, the objective catalog 110 is configured to expose interfaces through which the objective catalog 110 receives requests to discover, retrieve, create, replace, update, or delete object class definitions. These requests may include full or partial identifiers of one or more object classes (such as objective classes, resource classes, rule classes, and the like) and definitions of the identified object classes. In response to receiving a discover request, the objective catalog 110 searches the objective repository 112 for class definitions that match the full or partial identifiers and returns the results of the search to the requestor. In response to receiving a retrieve request, the objective catalog 110 transmits information descriptive of the class definitions stored within the objective repository 112 for the one or more identified object classes. In response to receiving a create request, the objective catalog 110 stores the definition of the identified object class in the objective repository 112. In response to receiving a replace request, the objective catalog 110 replaces the definition of the identified object class in the objective repository 112 with a class definition included in the request. In response to receiving an update request, the objective catalog 110 updates the definition of the identified object class in the objective repository 112 with class definition information included in the request. In response to receiving a delete request, the objective catalog 110 deletes the definition of the identified object class from the objective repository 112.

According to some embodiments, the objective catalog 110 is configured to expose interfaces through which the objective catalog 110 receives requests to discover, instantiate, and destroy object instances. These requests may include full or partial identifiers of one or more object classes (such as objective classes, resource classes, and the like), definitions of the identified object classes, and full or partial identifiers of one or more instantiated objects (such as objective instances, resource objects, and the like). In response to receiving a discover request, the objective catalog 110 searches the elastic computing infrastructure, via the objective repository 112 or the execution engine 118, for objects that match the full or partial identifiers and returns the results of the search to the requestor. These results may include one or more identifiers of objects with characteristics that match the full or partial identifiers included in the discovery request. In response to receiving a create request, the objective catalog 110 retrieves the class definition for one or more objects identified in the create request and transmits a request to a management component, such as the execution engine 118, to instantiate an object using the retrieved class definition. In response to receiving a destroy request, the objective catalog 110 transmits a request to the management component (e.g., the execution engine 118) to destroy the object identified in the destroy request.

Information within the provisioning and management system 100, including data within the objective repository 112, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

As shown in FIG. 1, the objective designer 106 exchanges (i.e. sends or receives) information descriptive of objectives with the designer 102. More specifically, according to some embodiments, the objective designer 106 is a design tool that provides interfaces that create, edit, and debug objective types to extend the capabilities of the elastic computing infrastructure. The objective designer 106 stores information descriptive of the objective types in the objective catalog 110 where the objective type information can be accessed and used by other system components, such as the execution engine 118, to instantiate objective objects.

According to various embodiments, the objective designer 106 described above executes a variety of processes. For example, according to one embodiment, the objective designer 106 is configured to process user authentication requests. In this embodiment, the objective designer 106 receives a user authentication request from a user, such as the designer 102, via a user interface. The user authentication request may include information descriptive of authentication credentials (e.g., identity and password) of the user. In response to receipt of the user authentication request, the objective designer 106 compares the authentication credentials to persistently stored user account information and, where the authentication credentials match credentials persistently stored in user account information, grants the user access to the interfaces provided by the objective designer 106, in accord with any restrictions included in the user account information.

According to another embodiment, the objective designer 106 is configured to process requests to discover available objective types. In this embodiment, the objective designer 106 receives a discovery request from a user, such as the designer 102, via a user interface. The discovery request may include search criteria that specify at least a portion of one or more characteristics of one or more objective types. In response to receipt of the discovery request, the objective designer 106 transmits a discover request to the objective catalog 110. This discover request may include search criteria specifying full or partial identifiers of objective classes based on the characteristics received in the discovery requests. Responsive to receiving a response to the discover request from the objective catalog 110, and the objective designer 106 provides information descriptive of search results included in the response to the user via the user interface.

In another embodiment, the objective designer 106 is configured to process requests to create objective types. In this embodiment, the objective designer 106 receives a creation request from a user, such as the designer 102, via a user interface. The creation request may include information descriptive of a variety of characteristics of objective types. For example, this information may describe the name, value, and type of one or more properties; linkages to other objects; and the processing executed by invocation of standard objective methods, such as create, update, delete, event, and measure methods. In response to receipt of the creation request, the objective designer 106 transmits a create request to the objective catalog 110. This create request may include an objective type class definition based on the characteristics received in the creation request. Responsive to receiving a response to the create request from the objective catalog 110, and the objective designer 106 provides information descriptive of the results included in the response to the user via the user interface.

The objective portal 108, according to an embodiment illustrated in FIG. 1, implements interfaces that support for the overall command and control (i.e., management) of the elastic computing infrastructure. As shown, the objective portal 108 exchanges information descriptive of types and instances of objectives with the administrator 104. More particularly, according to some embodiments, the objective portal 108 is an administrative tool that provides interfaces to manage instances of objectives over their lifetimes. The objective portal 108 interacts with the objective catalog 110 to obtain objective types and instances of objectives in order to invoke selected methods of those instances.

Because resources and objectives share a common object model, in some embodiments the objective portal 108 provides a generic presentation to facilitate visual interaction with these components of the system. In other embodiments, the objective portal 108 implements an integrated display interface that delegates type specific presentation to specialized presentation objects provided by resource types and objective types. More specifically, presentations specific to resource types belonging to a particular domain may provide a style of interaction that is more intuitive and suitable to the semantics of those resource types. In still other embodiments, the objective portal 108 implements an interface that provides domain specific presentations, when information descriptive of those presentations is available and otherwise presents a generic presentation as a fallback, when domain specific presentations are not available.

According to various embodiments, the objective portal 108 described above executes a variety of processes. For example, according to one embodiment, the objective portal 108 is configured to process user authentication requests. In this embodiment, the objective portal 108 receives a user authentication request from a user, such as the administrator 104, via a user interface. The user authentication request may include information descriptive of authentication credentials (e.g., identity and password) of the user. In response to receipt of the user authentication request, the objective portal 108 compares the authentication credentials to persistently stored user account information and, where the authentication credentials match credentials persistently stored in user account information, grants the user access to the interfaces provided by the objective portal 108, in accord with any restrictions included in the user account information.

According to another embodiment, the objective portal 108 is configured to process requests to discover available objective types. In this embodiment, the objective portal 108 receives a discovery request from a user, such as the administrator 104, via a user interface. The discovery request may include search criteria that specify at least a portion of one or more characteristics of one or more objective types. In response to receipt of the discovery request, the objective portal 108 transmits a discover request to the objective catalog 110. This discover request may include search criteria specifying full or partial identifiers of objective classes based on the characteristics received in the discovery requests. Responsive to receiving a response to the discover request from the objective catalog 110, and the objective portal 108 provides information descriptive of search results included in the response to the user via the user interface.

In another embodiment, the objective portal 108 is configured to process requests to create objectives. In this embodiment, the objective portal 108 receives a creation request from a user, such as the administrator 104, via a user interface. The creation request may include information descriptive of a variety of characteristics of objectives. For example, this information may describe the objective type and the property values for the instance of the objective. In response to receipt of the creation request, the objective portal 108 transmits a request to the execution engine 118 to instantiate the objective within the elastic computing infrastructure, execute is create method, and return information descriptive of any results provided by execution of the create method to the user.

In another embodiment, the objective portal 108 is configured to process requests to measure instances of objectives. In this embodiment, the objective portal 108 receives a measurement request from a user, such as the administrator 104, via a user interface. The measurement request may include one or more identifiers of one or more instances of objectives to be measured. In response to receipt of the measurement request, the objective portal 108 issues a request to the execution engine 118 to locate the identified instances, execute the measure method of each, and return information descriptive of any results provided by execution of the measure methods to the user. The results of execution of a measure method may include information descriptive of performance of the instance and faults encountered during its execution.

In another embodiment, the objective portal 108 is configured to process requests to trace instances of objectives. In this embodiment, the objective portal 108 receives a trace request from a user, such as the administrator 104, via a user interface. The trace request may include one or more identifiers of one or more instances of objectives to be traced. In response to receipt of the trace request, the objective portal 108 issues a request to the execution engine 118 to locate the identified instances and return information descriptive of associations between the indentified instances and constituents of the identified instances to the user. It is to be appreciated that the information returned by the trace request may include nested layers of objects between the identified instances and, ultimately, the physical computing resources allocated to the execution of the identified instances. The results of execution of a trace method may include information descriptive of the impact of physical resource failures on one or more objectives.

In another embodiment, the objective portal 108 is configured to process requests to reverse-trace physical computing resources. In this embodiment, the objective portal 108 receives a reverse-trace request from a user, such as the administrator 104, via a user interface. The reverse-trace request may include one or more identifiers of one or more physical computing resources to be reverse-traced. In response to receipt of the reverse-trace request, the objective portal 108 issues a request to the execution engine 118 to locate the physical computing resources and return information descriptive of associations between the physical computing resources and the virtual resources supported by the physical computing resources to the user. It is to be appreciated that the information returned by the reverse-trace request may include nested layers of objects between the physical computing resources and, ultimately, the high level objectives implemented using the physical computing resources. The results of execution of a reverse-trace method may include information descriptive of the impact of physical resource failures on one or more objectives.

In another embodiment, the objective portal 108 is configured to process requests to repair instances of objectives. In this embodiment, the objective portal 108 receives a repair request from a user, such as the administrator 104, via a user interface. The repair request may include one or more identifiers of one or more instances of objectives to be repaired. In response to receipt of the repair request, the objective portal 108 issues a request to the execution engine 118 to locate the identified instances and request that the identified instances execute their repair methods. Responsive to receiving a request to execute a repair method, an objective instance executes a repair process configured to restore the objective instance to a normal operating state. By execution of the repair process, the objective instance may reallocate (or cause constituent objects to reallocate) resources to the service of the objective instance. Further, during execution of the repair method, the objective instance may transmit requests to constituent objectives to execute their repair methods. The results of execution of a repair method may include newly realized, functioning objective and one or more indications of the success or failure of the repair method and the success or failure of the methods taken by its constituent objectives.

In another embodiment, the objective portal 108 is configured to process requests to model objectives without instantiating the objectives. In this embodiment, the objective portal 108 receives a model request from a user, such as the administrator 104, via a user interface. The model request may include one or more identifiers of one or more instances of objectives to be modeled. In response to receipt of the repair request, the objective portal 108 issues one or more retrieve requests to the objective catalog 110 to retrieve the class definition of the identified objective and its constituent objectives, if any exist. Responsive to receiving information descriptive of the class definitions of the identified objective and its constituents from the objective catalog 110, the objective portal 108 generates a model that compares the resources normally allocated to the operation of each objective and its constituents to the amount of resources available within the elastic computing infrastructure. This model may further account for elastic policies that alter the amount of resources allocated to the objective and its constituents over time. In some embodiments, the objective portal 108 displays a representation of the model and is results within the user interface. The information displayed by the objective portal 108 can include excess or insufficient capacity over the lifetime of the objective instance. It is to be appreciated that, in some examples, the model can simulate the realization of a plurality of high level objectives and, in so doing, provide the user with information descriptive of the sufficiency or insufficiency of the elastic computing infrastructure under a variety of configurations.

Thus in one embodiment, via the objective portal 108, the provisioning and management system is configured to analyze resource utilization requirements separately from the actual orchestration of the resources. This allows the provisioning and management system to model the resource requirements of a complex system by examining the requirements of its individual components taken in the aggregate prior to actually provisioning the objective in the infrastructure. The provisioning and management system implements this capability in objectives by defining separate methods for the creation of the object model and realization the objective model in the elastic computing infrastructure.

In creating a model, the provisioning and management (via, for example, the objective portal 108) system builds out a graph of objective instances which represent the implementation of a complex system and all the information required to actually provision the system in the elastic computing infrastructure without actually carrying it out. The provisioning and management system thus has a model of what the system would look like in total, what its resource requirements are, and how it would be mapped on the defined infrastructure. The provisioning and management system uses the information to predict what the impact of realizing the objective would be on the infrastructure ahead of actually carrying out the provisioning. Examples of functions provided by the provisioning and management system using this information include: modeling the overall requirements of one or more objectives and making adjustments to the physical and virtual resources ahead of actual provisioning; modeling application services which could be realized at some future time or circumstance and understanding the impact of deploying them; exploring what-if scenarios with complex system models that allow trade-offs between the types or number of objectives deployed and the infrastructure requirements to support the objectives; comparing the requirements of objectives to the capacity of the elastic computing infrastructure to determine the impact of realizing an objective on the current elastic computing infrastructure; determine the overall utilization of the elastic computing infrastructure and manage and plan for growth; optimize objective deployment to optimize use of the elastic computing infrastructure; and determine readiness for executing disaster recovery scenarios.

In some embodiments, the provisioning and management system realizes, via the execution engine 118, the model described above from the fully formed and specified object graph and causes its associated infrastructure resources to be provisioned on the elastic computing infrastructure. The provisioning and management system monitors the performance of realized objectives and their constituent resources and measures the operation of the objectives and resources against the predictive model described above. The provisioning and management system tracks and stores information descriptive of differences between actual resource utilization and predicted utilization. This information descriptive of the differences is analyzed to improve the predictive accuracy of future models.

In some embodiments, the provisioning and management system exposes the relationship information maintained within each objective instance to communicate status throughout the objective graph. For example, some embodiment allow a user to determine answers to questions like: which tenants would be affected by the failure of a particular switch port; which system components have failed or degraded as a result of a failure of any given lower level component; and what application services will be affected by a planned outage.

In another embodiment, the provisioning and management system presents, via the objective portal 108, overall state information for one or more objectives that is aggregated from state information descriptive of the state of constituent resources of the one or more objectives. For example, an objective that represents a redundant database pair would have two constituent resources, the primary database server and the fail-over server. If one of the constituent database servers were to fail, the objective portal 108 would report the overall status of the redundant database objective as degraded rather than failed presuming the fail-over server continued to operate. In this way, traceability (relationship) information is communicated through the objective graph and modified along the way to aggregate and add application specific semantics to the information.

Each of the interfaces disclosed herein, including those presented by the objective designer 106 and the objective portal 108, may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the provisioning and management system 100 or unauthorized access to the provisioning and management system 100.

As shown in FIG. 1, the execution engine 118 is configured to receive and process requests to instantiate objects, destroy objects, exchange information with instantiated objects, monitor objects instantiated in execution of the objective instances 114 and interoperate with the resource objects 120 to implement the elastic computing infrastructure represented by the monitored objects. The resource objects 120 interface with the virtual and physical resources that they support via protocols that the virtual and physical resources are designed to support. In at least some embodiments, the execution engine 118 interoperates with the resource objects 120 via a rules engine that uses an injection design pattern, such as the rules engine 210 described further below.

In some embodiments, the execution engine 118 monitors the health and performance level of objects executing in the elastic computing infrastructure. For example, in one embodiment, the execution engine 118 monitors the performance level of an objective object through metrics that characterize the performance level of the objective object. These metrics may be gathered via a measure method. In another embodiment, the execution engine 118 monitors the performance level of an objective object by monitoring performance of its constituent objects. For instance, using traceability information, the execution engine 118 may detect an outage has occurred (e.g., a physical computing resource upon which the objective depends has failed).

In response to detecting that the performance level of an objective object does not meet (or will shortly not meet) a predetermined performance level, the execution engine 118 may take some form of corrective action (e.g. adjust the capacity of the physical and virtual resources available to the objective object). For example, the execution engine 118 may adjust (e.g., grow) virtual resources available to the objective object to compensate for the failed physical resource, may alter the placement of the virtual resource from the failed physical resource to an operational physical resource, may notify the objective object of the outage to allow the objective object to shutdown gracefully, etc.

Figure 2:
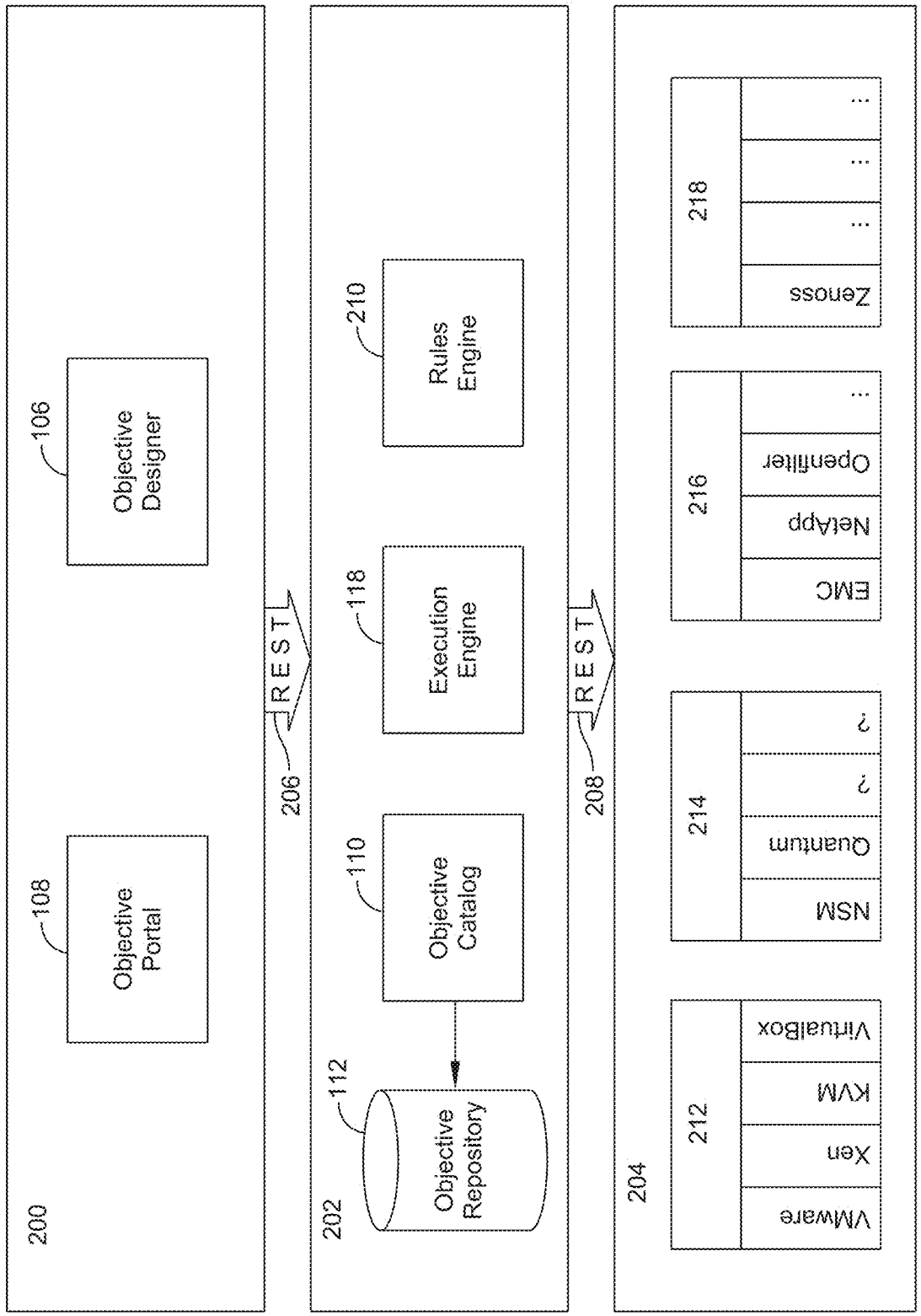
FIG. 2 is a block diagram of an example distributed computer system including components illustrated in FIG. 1.

FIG. 2 illustrates an example system architecture including element of the provisioning and management system 100 according to one embodiment. As shown in FIG. 2, the provisioning and management system includes web server 200, application server 202, resource management server 204, and communication networks 206 and 208. The web server 200 includes the objective portal 108 and the objective designer 106. The application server 202 includes objective repository 112, the objective catalog 110, the execution engine 118, and a rules engine 210. The resource management server 204 includes resource objects 212, 214, 216, and 218. Each of the servers 200, 202, and 204 may include one or more virtual servers or one or more physical servers in accord with the computer systems described below with reference to FIG. 3.

As shown in FIG. 2, the web server 200 exchanges information with the application server 202 via the network 206. The application server 202, in turn, exchanges information with the resource management server 204 via the network 208. The networks 206 and 208 may include any communication network through which computer systems may exchange information. For example, the networks 206 and 208 may be a public network, such as the internet, and may include other public or private networks such as LANs, WANs, extranets and intranets.

Information may flow between the components illustrated in FIG. 2, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein. In one embodiment illustrated in FIG. 2, the web server 200, the application server 202, and the resource management server 204 exchange information over the networks 206 and 208 using REST over HTTP.

In an embodiment in accord with FIG. 2, the objective portal 108 and the objective designer 106 are configured to provide user interfaces through which each interacts with one or more users. The objective portal 108 and the objective designer 106 may employ a variety of metaphors and user interface elements to provide and receive information. Particular embodiments of the objective portal 108 and the objective designer 106 are not limited to any one metaphor or configuration of user interface elements. For instance, in one embodiment, the objective portal 108 and the objective designer 106 serve browser-based user interfaces that are rendered by a web-browser running a computer system accessible by users. The objective portal 108 and the objective designer 106 exchange a variety of information with users. This information may include any of the information described herein with reference to the objective repository 112 or any of the other components of the provisioning and management system 100.

In some embodiments, the objective portal 108 and the objective designer 106 provide user interface elements through which the objective portal 108 and the objective designer 106 exchange information descriptive of rules that specify when and under what circumstances access to an object is granted. More specifically, in these embodiments, the objective portal 108 and the objective designer 106 receive requests to configure access rules for particular types of objectives, resources, and other objects. These rule configuration requests may include information descriptive of the identity of the type of object to which the rule applies, the manners of access allowable for the object type, and the identity of objects or processes that may access the object type. Responsive to receive of a rule configuration request, the objective portal 108 and the objective designer 106 store information descriptive of the rule in objective repository 112.

In some embodiments, the rules engine 210 receives requests to authorize access to instances of various classes (such as objective instances, resource objects, and the like). These access requests may include information descriptive of the identity of the instance for which access is requested, the identity of the requester, and the manner of access requested. Responsive to receipt of an access request, the rules engine 210 determines where the request is allowable according to any rules that are applicable to the instance for which access is requested. Rules may be automatically applicable to an instance due to the object type of the instance. Rules may also be applicable via a manual association of the rule to the instance by an external entity, such as a user or other system. Rules may grant, deny, or negotiate access based on identity, manner of access, specify resource methods that will determine access, etc. Rules may be established by the system architect, by a resource implementation, or as part of specification of an objective.

In some embodiments when determining whether an access request is allowable, the rules engine 210 references an access control list associated with the object instance for which access is requested. In other embodiments, the rules engine 210 utilizes an interceptor pattern so rules can be applied through the elastic computing infrastructure in isolation from other components.

In other embodiments, the functionality of the rules engine 210 described herein is implemented by object instances of one or more rule classes. These rule object classes may be stored in the objective repository 112 and instantiated by the execution engine 118. Instantiated rule objects modify the behavior of other object instances (e.g., one or more objectives). Rule objects accomplish this by injecting actions into the process executed by the other object instances to affect the outcome normally defined by the object type. In this way, rule objects may modify actions that span one or more object types.

In some embodiments, objects include injection points that are well defined points where the object may delegate processing to a rule object by calling a specified interface. Examples of operations that a rule object may execute include altering the default processing executed by an object, aborting processing being executed by an object, and adding properties to an object, among other operations.

According to some embodiments, a system component (such as the execution engine 118) is configured to identify one or more rule objects to inject into one or more context objects executing one or more processes. In these embodiments, the execution engine 118 binds, at runtime, the one or more rule objects to the one or more context objects though rule actions. More specifically, the execution engine 118 binds a rule object to a given injection point if the rule object corresponds to the context object as defined by the injection point and if the rule object defines a rule action that corresponds to the injection point name.

When a rule object is injected, the rule action(s) which bind to the injection point are invoked per the order specified by the injection point (i.e., before the injection point executes or after the injection point executes). Any arguments passed to the rule action and/or return values expected are defined and handled by the injection point.

In some embodiments, rule objects may encapsulate direct rules and appurtenant rules. An injection point may define itself to only apply direct rules, to only apply appurtenant rules, or to apply both direct and appurtenant. Direct rules correspond to the context object by an explicit relationship with the context object that is defined in the injection point. An injection point within a context object may have zero or more direct rules or appurtenant rules associated with it. Appurtenant rules are indirectly associated with a context object by way of governors included in the rule object. The distance from the context object to a governor of the appurtenant rule can have a role in determining the injection of the rule object.

An injection point may be configured to inject appurtenant rule objects in various ways. For example, an injection point may inject all appurtenant rule objects it finds, may inject all appurtenant rule objects it finds prioritized by distance, or it may inject all appurtenant rule objects it finds with the shortest distance from the context object.

In some embodiments, when multiple rule objects are identified for an injection point, the order that they are applied is defined by the injection point. In some examples, rule objects are injected in order of a distance from the context object from closest to farthest. In other examples, rule objects having the same distance are injected in order by governor. In still other examples, rule objects that are directly and expressly associated with the context object by the injection point are injected according to the order specified by the injection point.

Examples of the processes that rule objects may execute include access control processes, resource placement processes, elastic policy processes, and prioritization processes. Examples of access control processes include those described above with reference to the rules engine 210 (e.g., processes that resolve which components, objects, or entities may access objects and for what purpose or in what context). Resource placement processes determine where an objective should allocate resources (e.g., identify one or more resource managers through which resources should be allocated). Elastic policy processes determine under what circumstances an elastic service objective should grow or shrink capacity and by how much. Prioritization processes provide for system wide dynamic control over which objects have priority for access to physical and virtual resources over other objects.

In one example, access control is accomplished by applying access rules at injection points where access to objects is enabled, such as get, update, delete, and execute methods. As described above with regard to the rule engine 210, rule objects implementing access control may consider a wide variety of factors when determining whether or not to grant an access request. Therefore, in some embodiments, an injection point of a context object may issue an access request including information descriptive of the resource for which access is requested, information identifying of the context object issuing the access request, and information directly identifying the rule object to which the access determination is being delegated.

Continuing this example, in response to receiving the access request, the execution engine 118 searches the objective repository 112 for one or more rule objects to inject into the context object. Where the execution engine 118 identifies one or more rule objects that correspond to the injection point in a manner defined by the injection point, the execution engine 118 injects the rule object into the context object. This correspondence may be direct (e.g., the rule object is expressly referenced by the injection point) or indirect (e.g., the rule object is referenced via a governor). Next, the execution engine 118 binds rule actions to the injection point where the rule actions correspond to the injection point name and the execution engine 118 executes the rule action in an order defined by the injection point as described above.

In another example, resource placement is accomplished by applying placement rules via injection points prior to creating resource objects. In some embodiments, a context object may issue a placement request including information descriptive of a resource object to be created and information identifying of the context object issuing the placement request. The execution engine 118 may respond to the placement request with information identifying one or more resource manager objects that may be used to create the resource object. In some embodiments, the default response from the execution engine 118 includes information identifying all resource manager objects that support the resource object. For example, the response from the execution engine 118 may be an array of resource manager URLs that are suitable for creating the resource object. When multiple resource managers satisfy the placement request, the context object determines which of the resource manager URLs to use to request the resource object.

In some embodiments, an injection point of a context object may issue another placement request including information descriptive of a resource object to be created, information identifying of the context object issuing the placement request, information identifying a placement rule object associated with the context object, and information descriptive of the resource manager URLs returned in response to the previous placement request. The placement rule object may respond to the placement request with replacement information identifying one or more resource manager objects that may be used to create the resource object (instead of the resource manager objects identified in the previous response). In some embodiments, the injection point applies appurtenant rules by selecting rules by rule type and applying all rules of a type which have the minimum distance from the context object.

In at least one embodiment, these appurtenant rules may be encapsulated in capacity rule objects and region rule objects. Capacity rule objects may add a requirement that any resource manager included in the response to the placement request have sufficient resources to create the requested resource object or have sufficient resources to create the request resource while maintain some specified amount of resources in reserve. Region rule objects may add a requirement that any resource manager included in the response to the placement request be associated with (or not associated with) an identified region (e.g., physical location). In some embodiments, the region rule object identifies the region associated with the resource manager by referencing the value of a tag of the resource manager. A region rule object may add a region property to the context object for future reference and modification.

In one embodiment in accord with FIG. 2, the resource management server 204 hosts four resource objects: 212, 214, 216, and 218. In this embodiment, the resource object 212 implements and manages compute resources by interoperating with one or more hypervisors. The hypervisors supported by the resource object 212 include VMWARE VSPHERE hypervisor commercially available from VMware Inc. of Palo Alto, Calif.; XEN hypervisor commercially available from Citrix Systems, Inc. of Fort Lauderdale, Fla.; KVM hypervisor commercially available from Red Hat, Inc. of Raleigh, N.C.; and VIRTUALBOX hypervisor commercially available from ORACLE Corporation of Redwood City, Calif. Also in to this embodiment, the resource object 214 implements and manages network bandwidth by interoperating with one or more network management systems. The network management systems supported by the resource object 214 include OPENSTACK networking available from the OPENSTACK Project and NICIRA network virtualization platform commercially available from VMWare Inc. According to this embodiment, the resource object 216 implements and manages data storage by interoperating with one or more data storage management systems. The data storage management systems supported by the resource object 216 include $EMC^2$ solutions available from EMC Corporation of Hopkinton, Mass.; NETAPP ONCOMMAND Management Software commercially available from NetApp, Inc. of Sunnyvale Calif.; Openfiler available from The Openfiler Project; and. In addition, the resource object 218 implement and manages service assurance functionality by interoperating with one or more service assurance management systems. The service assurance management systems supported by the resource object 218 include ZENOSS commercially available from Zenoss, Inc. of Annapolis, Md.

Embodiments of the provisioning and management system 100 are not limited to the particular configuration illustrated in FIGS. 1 and 2. Various examples utilize a variety of hardware components, software components and combinations of hardware and software components configured to perform the processes and functions described herein. In some examples, the metadata association system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
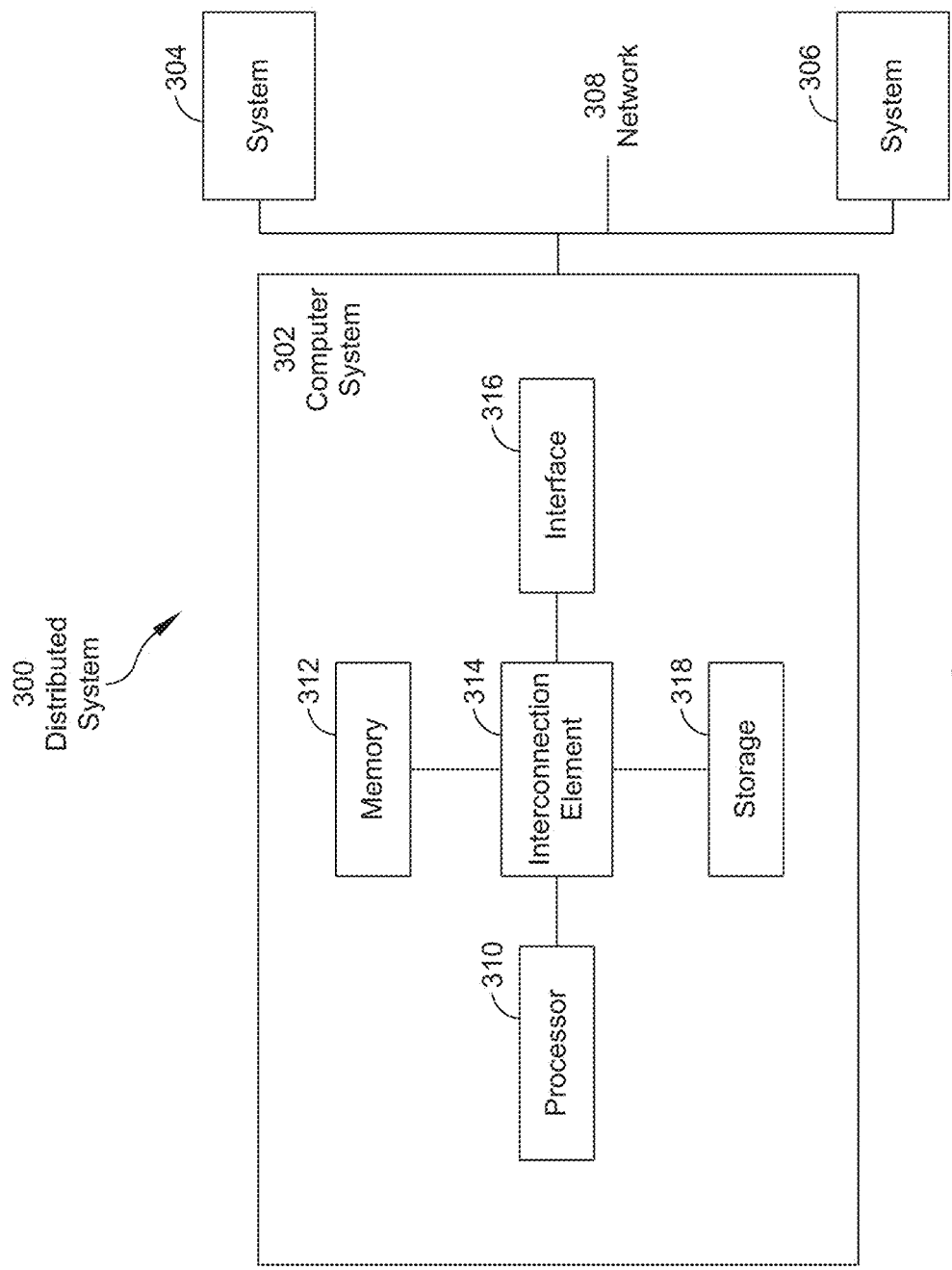
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some example processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer infrastructure for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Example Video On Demand Objective

Figure 8:
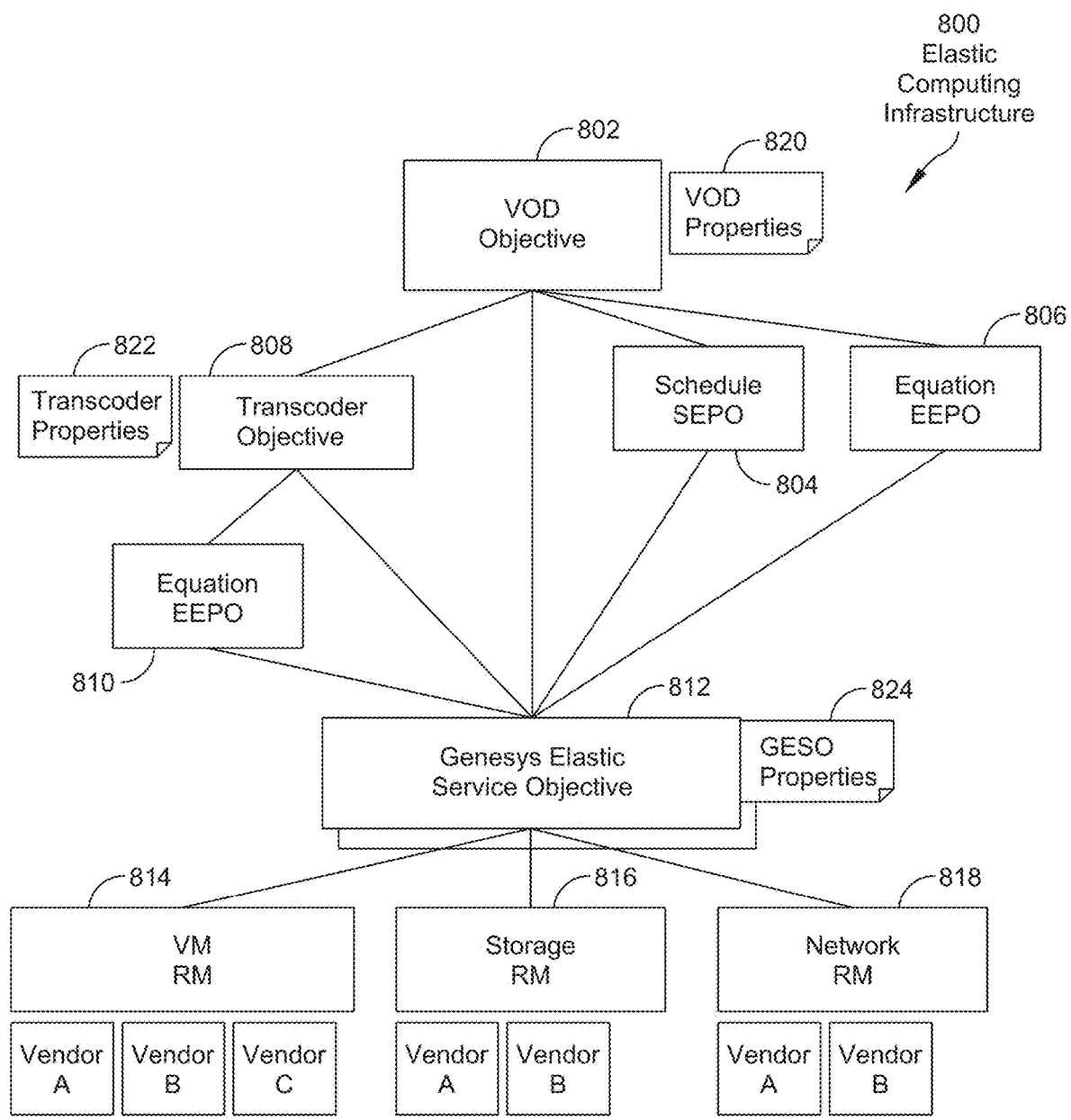
FIG. 8 is a block diagram of an elastic computing infrastructure configured to implement a video on demand service.

In at least one embodiment, the provisioning and management system configures an elastic computing infrastructure to implement a Video On Demand (VOD) objective. FIG. 8 illustrates this embodiment. As shown in FIG. 8, the provisioning and management system has configured, and the elastic computing infrastructure is executing, a VOD objective 802, a VOD schedule elastic policy objective (SEPO) 804, a VOD equation elastic policy objective (EEPO) 806, a transcoder objective 808, an transcoder EEPO 810, an elastic service objective 812, a compute resource object 814, a storage resource object 816, and a network resource object 818. The VOD objective has VOD properties 820. The transcoder objective 808 has transcoder properties 822. The elastic service objective 812 has elastic service properties 824. As shown in FIG. 8, the compute resource object 814 supports resources from vendors A, B, and C. The storage resource object 816 supports resources from vendors A and B. The network resource object 818 supports resources from vendors A and B.

In the embodiment shown, the VOD objective 802 is configured to request and utilize resources allocated to its operation by the elastic service objective 812 to provide a cloud-based video on demand service to requestors. More specifically, the VOD objective 802 exposes interfaces through which the VOD objective 802 receives requests for provision, monitoring, and management of a VOD service. The monitoring requests may include information identifying one or more operations of the VOD service for which state information is requested. In response to receiving a monitoring request, the VOD objective 802 may inject a rule object governing access to the VOD objective 802 and, where the rule object allows access, return operational state information descriptive of its operational state or the operational state of one of its constituent components.

The provisioning requests may include information descriptive of an amount of virtual resources to allocate to the VOD service or adjustments thereto. Responsive to receipt of a provisioning request, the VOD objective 802 may execute business logic to determine whether the provisioning request comports with one or more policies implemented within the VOD objective 802. For example, in some embodiments, the VOD objective 802 implements a policy to control the operational cost of the VOD objective 802. In these embodiments, the VOD objective 802 may execute instructions that cause the VOD objective 802 to determine a cost associated with a provisioning request and, depending on the cost, execute or not execute the provisioning request. For example, the VOD objective 802 may identify a number of transcoder objective licenses purchased by the owner of the VOD objective 802 and if implementing the provisioning request would cause the number of active transcoder objective instances to exceed the number of active transcoder licenses purchased (e.g., 10 transcoder licenses), the VOD objective 802 would not execute the provisioning request and return an appropriate notification to the requestor of the provisioning request. Other business policies may be implemented with the VOD objective 802 (or any objective described herein) without departing from the scope of this disclosure. Where the provisioning request comports with any business policies implemented within the VOD objective 802, the VOD objective 802 transmits one or more allocation requests the elastic service objective 812.

Continuing with the embodiment illustrated in FIG. 8, the transcoder objective 808 is configured to request and utilize resources allocated to its operation by the elastic service objective 812 to provide a transcoding service to requestors. More particularly, the transcoder objective 808 exposes interfaces through which the transcoder objective 808 receives requests to provision, monitor, and manage a transcoder service. The provisioning requests may include information descriptive of an amount of virtual resources to allocate to the transcoder service or adjustments thereto. Responsive to receipt of a provisioning request, the transcoder objective 808 transmits one or more allocation requests to the elastic service objective 812. The monitoring requests may include information identifying one or more operations of the transcoder service for which state information is requested. In response to receiving a monitoring request, the transcoder objective may return operational state information descriptive of its operational state or the operational state of one of its constituent components.

In the embodiment illustrated in FIG. 8, the elastic service objective 812 is configured to process requests to allocate resource capacity from the compute, storage, and network domains toward the operation of one or more higher level objectives. These allocation requests may include information descriptive of the domain from which resources are requested, the capacity requested (e.g., the number of logical resource units requested), and the elastic action requested. In at least one embodiment, responsive to the receipt of an allocation request, the elastic service objective 812 determines whether the request comports with one or more rules, such as may be implemented in one or more rule objects. If so, the elastic service objective 812 processes the allocation request and indicates the results of the processing to the requestor. These results may include a handle to, or some other identifier of, a resource object having the requested properties and capacity. If the allocation request does not comport with one or more rules, the elastic service objective 812 does not process the allocation request further and indicates to the requestor that the allocation request does not comport with one or more rules.

Examples of the resources allocated by the elastic service objective 812 include those resources with capacities managed by the compute resource object 814, the storage resource object 816, and the network resource object 818. Examples of the higher level objectives supported by the elastic service objective 812 include the VOD objective 802 and the transcoder objective 808.

In some embodiments, to allocate resource capacities, the elastic service objective 812 executes one or more elastic actions. Examples of these elastic actions include constrain, grow, and contract methods. In at least one embodiment, some properties of the elastic service objective 812 are used by the elastic actions to control allocation of resource capacities to objectives. Table 1 lists properties of the elastic service objective 812 that are directed toward the elastic control of resource capacities according to one embodiment.

TABLE 1

| Property Name | Value | Notes |
| --- | --- | --- |
| IsElastic | | elastic objective flag |
| MinUnits | | Min resource units |
| MaxUnits | | Max resource units |
| CurResUnits | | The current active logical resource units |
| AdjResUnits | | Elastic grow or contract adjustment logical resource units |
| InitResUnits | | Initial logical resource units created during Realize |
| Zone | | Service Zone grouping attribute |
| Domain | | Service Domain grouping attribute |
| Priority | | Service priority attribute against other Services |
| Rank | | Rank Service within a priority group |

In this embodiment, the CurResUnits property tracks the currently allocated logical resource units for a domain. The AdjResUnits property specifies the number of logical resource units to allocate or de-allocate when executing the grow or contract methods, respectively. The MinResUnits property specifies the minimum number of logical resource units to which the domain is constrained if the constrain method is active. The MaxResUnits property specifies the maximum number of logical resource units to which the domain is constrained if the constrain method is active. The InitResUnits property defines the initial logical resource units to be allocated when the elastic service objective 812 is instantiated (i.e., realized).

In at least one embodiment, when executing the constrain, grow, and contract methods, the elastic service objective 812 reconciles the logical resource units into actual units that the compute resource object 814, the storage resource object 816, and the network resource object 818 are configured to process when allocating the resources that each manages. Table 2 lists properties of the elastic service objective 812 that are directed to the compute domain and that facilitate this reconciliation process.

TABLE 2

| Property Name | Value | Notes |
| --- | --- | --- |
| CpuSize | | Current CPU size (S, M, L) |
| MinCpuSize | | |
| MaxCpuSize | | |
| InitCpuSize | | Initial CPU size |
| MemSize | | Current memory size GB or (S, M, L) |
| MinMemSize | | |
| MaxMemSize | | |
| InitMemSize | | Initial Memory size |
| VmImage | | VM Image file |
| NICS | | Number of Virtual Network Interface |

Table 3 lists properties of the elastic service objective 812 that are directed to the storage domain and that facilitate the reconciliation process.

TABLE 3

| Property Name | Value | Notes |
| --- | --- | --- |
| VirNetDrivePath | | Virtual network drive path |
| MinStorageSize | | Min free space GB |
| MaxStorageSize | | Max storage space GB |
| StorageIncSize | | Elastic storage growth and contract unit GB |
| CurStorageSize | | Current storage allocation GB |
| InitStorageSize | | Initial storage allocation GB |
| ReadPerformance | | Read access performance (S, M, H) |
| WritePerformance | | Write access performance (S, M, H) |

Table 4 lists properties of the elastic service objective 812 that are directed to the network domain and that facilitate this reconciliation process.

TABLE 4

| Property Name | Value | Notes |
| --- | --- | --- |
| IsElastic | | elastic objective flag |
| MinUnits | | Min resource units |
| MaxUnits | | Max resource units |
| CurResUnits | | The current active logical resource units |
| AdjResUnits | | Elastic grow or contract adjustment logical resource units |
| InitResUnits | | Initial logical resource units created during Realize |
| Zone | | Service Zone grouping attribute |
| Domain | | Service Domain grouping attribute |
| Priority | | Service priority attribute against other Services |
| Rank | | Rank Service within a priority group |
| IsFaultResilient | | Require fault resilient resource provisioning |
| Cost | | Service cost attribute for the logical resource unit. Public cloud resource more costly than private. |

In the embodiment illustrated in FIG. 8, the elastic service objective 812 allocates capacities of resources from the compute, storage, and network domains. In other embodiments, the elastic service objective 812 allocates capacities of resources from other domains, such as the service assurance domain. Thus the embodiments disclosed herein are not restricted to any particular domain or set of domains.

According to the embodiment illustrated in FIG. 8, the VOD SEPO 804 is configured to execute one or more elastic actions according to a schedule. The schedule and elastic actions may be pre-configured and periodic to make resources available to the VOD objective 802 according to known demand patterns. In one embodiment, the VOD SEPO 804 executes an elastic action by setting one or more properties of the elastic service objective 812 to particular, designated values. According to this embodiment, the VOD SEPO 804 may be used to set the any property value according to a schedule. Table 5 lists properties of the VOD SEPO 804.

TABLE 5

| Property Name | Value | Notes |
| --- | --- | --- |
| Enable Collection of Schedule Policies | | Enable or disable this elastic policy |
| Time | | Start time of the policy |
| Duration | | Duration for the property is set to the value associated with the policy |
| Priority | | Priority of this schedule relative to others |
| Rank | | Rank of this prioritized policy group |
| List of properties to be changed | | |
| Property | | Property targeted for change |
| Value | | Value to which the targeted property will be changed |

As illustrated in FIG. 8, the VOD EEPO 806 is configured to execute one or more elastic actions when an equation specified by a property evaluates to a predetermined value. According to one embodiment, the VOD EEPO 806 may be used to set the any property value where the equation evaluates to a positive number. In this embodiment, the VOD EEPO 806 executes an elastic action by setting one or more properties of the elastic service objective 812 to particular, designated values. Table 6 lists properties of the VOD EEPO 806.

TABLE 6

| Property Name | Value | Notes |
| --- | --- | --- |
| Enable | | Enable or disable this elastic policy |
| Interval | | Time between equation evaluations |
| Priority | | Priority of this schedule relative to others |
| Rank | | Rank of this prioritized policy group |
| Equation | | User defined conditional equation string composed with Objective property name as operands (i.e. "VOD.StoreFront.TPS > 1000 && TC.QueJobLen < 2") |
| List of properties to be changed | | |
| Property | | Property targeted for change |
| Value | | Value to which the targeted property will be changed |

As illustrated in FIG. 8, the transcoder EEPO 810 is configured to execute one or more elastic actions when an equation specified by a property evaluates to a predetermined value. According to one embodiment, the transcoder EEPO 810 may be used to set the any property value where the equation evaluates to a positive number. In this embodiment, the transcoder EEPO 810 executes an elastic action by setting one or more properties of the elastic service objective 812 to particular, designated values. Table 7 lists properties of the VOD EEPO 806.

TABLE 7

| Property Name | Value | Notes |
| --- | --- | --- |
| Enable | | Enable or disable this elastic policy |
| Interval | | Time between equation evaluations |
| Priority | | Priority of this schedule relative to others |
| Rank | | Rank of this prioritized policy group |
| Equation | | User defined conditional equation string composed with Objective property name as operands |
| List of properties to be changed | | |
| Property | | Property targeted for change |
| Value | | Value to which the targeted property will be changed |

Figure 9A:
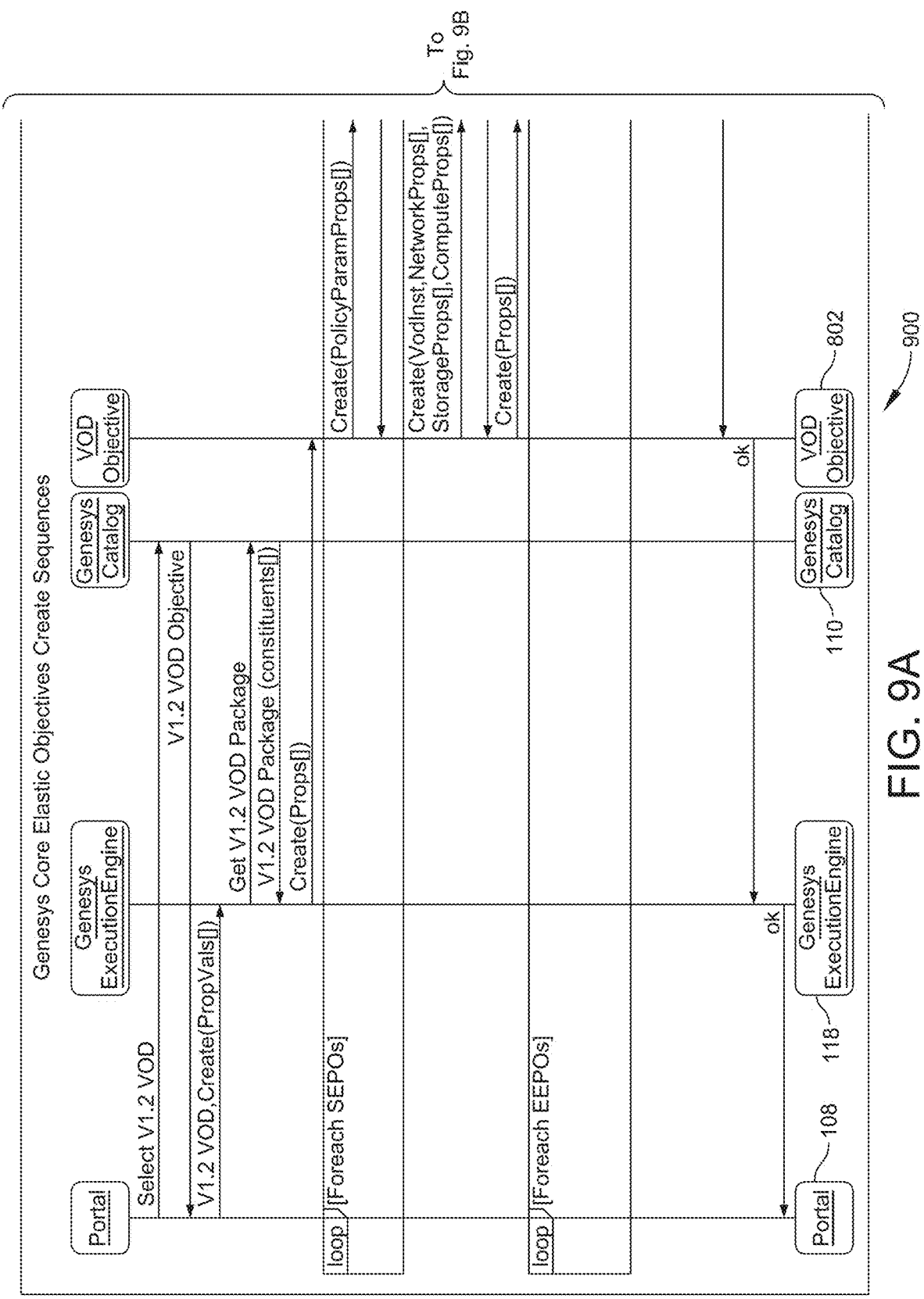
FIGS. 9A and 9B are a sequence diagram illustrating an example creation process.
Figure 9B:
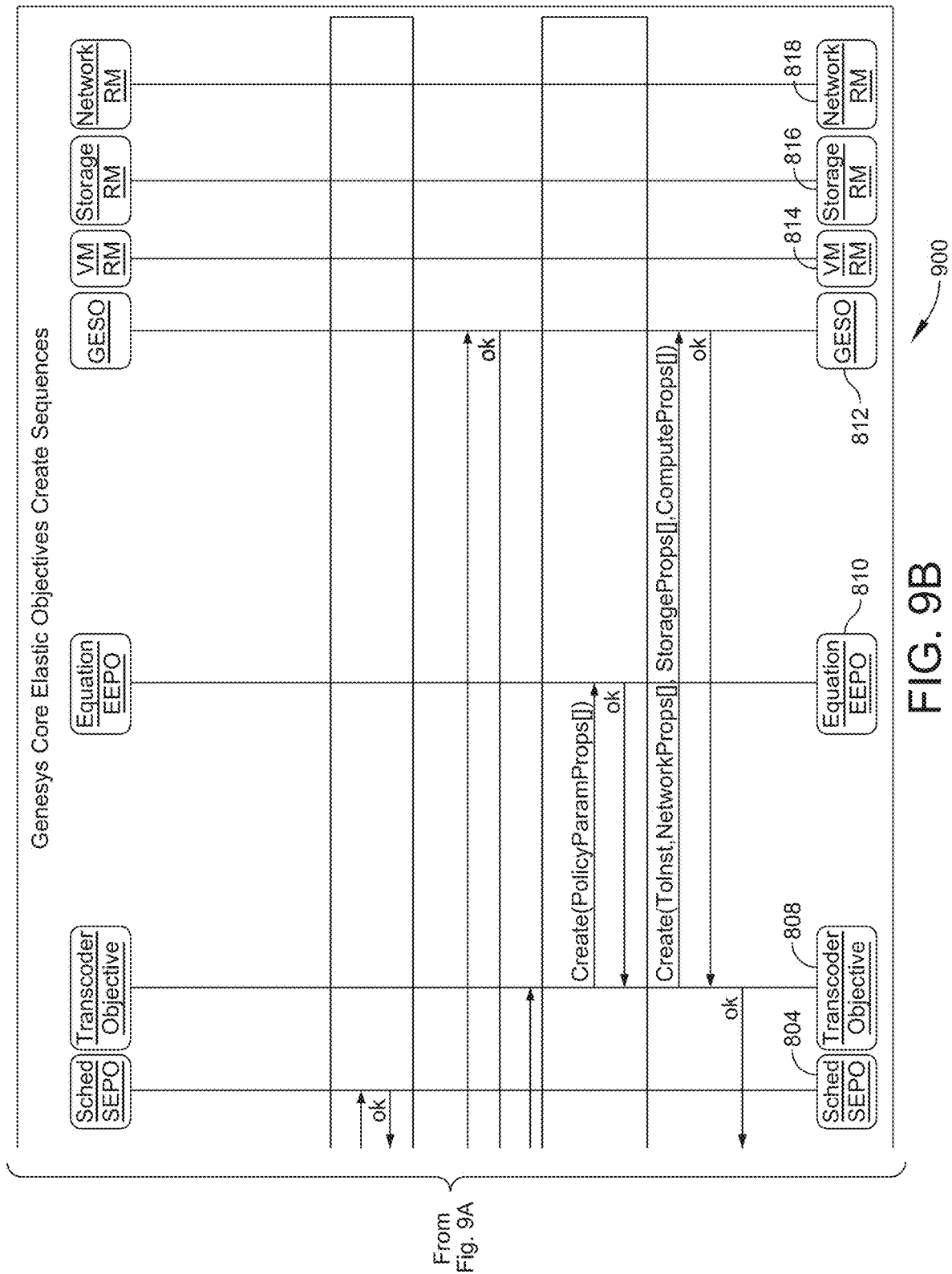

FIGS. 9A and 9B illustrate a creation process 900 that includes acts executed by various components of a provisioning and management system, such as the provisioning and management system 100 described above with reference to FIGS. 1 and 2, and an elastic computing infrastructure, such as the elastic computing infrastructure 800 described above with reference to FIG. 8. More particularly, the creation process 900 includes acts that create the objects which comprise the elastic computing infrastructure.

As illustrated in FIGS. 9A and 9B, an objective portal, such as the objective portal 108 described above with reference to FIG. 1, receives a request to establish version 1.2 of a VOD objective, such as the VOD objective 802 described above with reference to FIG. 8, within an elastic computing infrastructure. In response to receiving this execution request, the objective portal transmits a request for the class definition of version 1.2 of the VOD objective to an objective catalog, such as the objective catalog described above with reference to FIG. 1. This class definition request may include an identifier of version 1.2 of the VOD objective class. Responsive to receiving the class definition request, the objective catalog transmits information descriptive of the class definition of version 1.2 of the VOD objective to the objective portal. In response to receiving the class definition information, the objective portal next transmits a request to an execution engine, such as the execution engine 118 described above with reference to FIG. 1, to instantiate, within the elastic computing infrastructure, an instance of the VOD objective from the class definition information.

As shown in FIGS. 9A and 9B, the execution engine transmits a request for constituent class definitions of the VOD objective class to the objective catalog. Responsive to receiving the constituent class definitions request, the objective catalog transmits information descriptive of class definitions upon which the VOD objective class is dependent to the execution engine. In response to receiving the constituent class definition information, the execution engine instantiates one or more instances of the following classes using the constituent class definition information: the VOD objective class, a transcoder objective class (e.g., the transcoder objective 808 described above with reference to FIG. 8), a schedule SEPO class (e.g., the schedule SEPO 804 described above with reference to FIG. 8), an equation EEPO class (e.g., the equation EEPO 810 described above with reference to FIG. 8), an elastic service objective class (e.g., the elastic service objective 812), a compute resource class (e.g., the compute resource object 814), a storage resource class (e.g., the storage resource object 816), and a network resource class (e.g., the network resource object 818). Next, the execution engine transmits a request to the VOD objective instance to execute its create method using identifiers of these class instances.

As shown in FIGS. 9A and 9B, in response to receiving the request to execute the create method, the VOD objective instance transmits a request to the schedule SEPO instance to execute its create method using default policy parameters defined within the VOD objective class. In response to receiving this create execution request, the schedule SEPO instance executes its create method and responds with any execution results. Responsive to receiving these execution results, the VOD objective instance transmits a request to the elastic service objective instance to execute its create method using default resource parameters defined within the VOD objective class. In response to receiving this create execution request, the elastic service objective instance executes its create method and responds with any execution results. Responsive to receiving these execution results, the VOD objective instance transmits a request to the transcoder objective instance to execute its create method using default transcoder parameters defined within the VOD objective class. In response to receiving this create execution request, the transcoder objective instance executes its create method.

As illustrated in FIGS. 9A and 9B, in executing its create method, the transcoder objective instance transmits a request to the equation EEPO instance to execute its create method using default policy parameters defined within the transcoder objective class. In response to receiving this create execution request, the equation EEPO instance executes its create method and responds with any execution results. Responsive to receiving these execution results, the transcoder objective instance transmits a request to the elastic service objective instance to execute its create method using default resource parameters defined within the transcoder objective class. In response to receiving this create execution request, the elastic service objective instance executes its create method and responds with any execution results. In response to receiving these results, the transcoder objective instance responds the VOD objective instance with any execution results. In response to receiving any execution results, the VOD objective instance responds to the execution engine with any execution results. In response to receiving any execution results, the execution engine responds to the objective portal with any execution results.

Figure 10A:
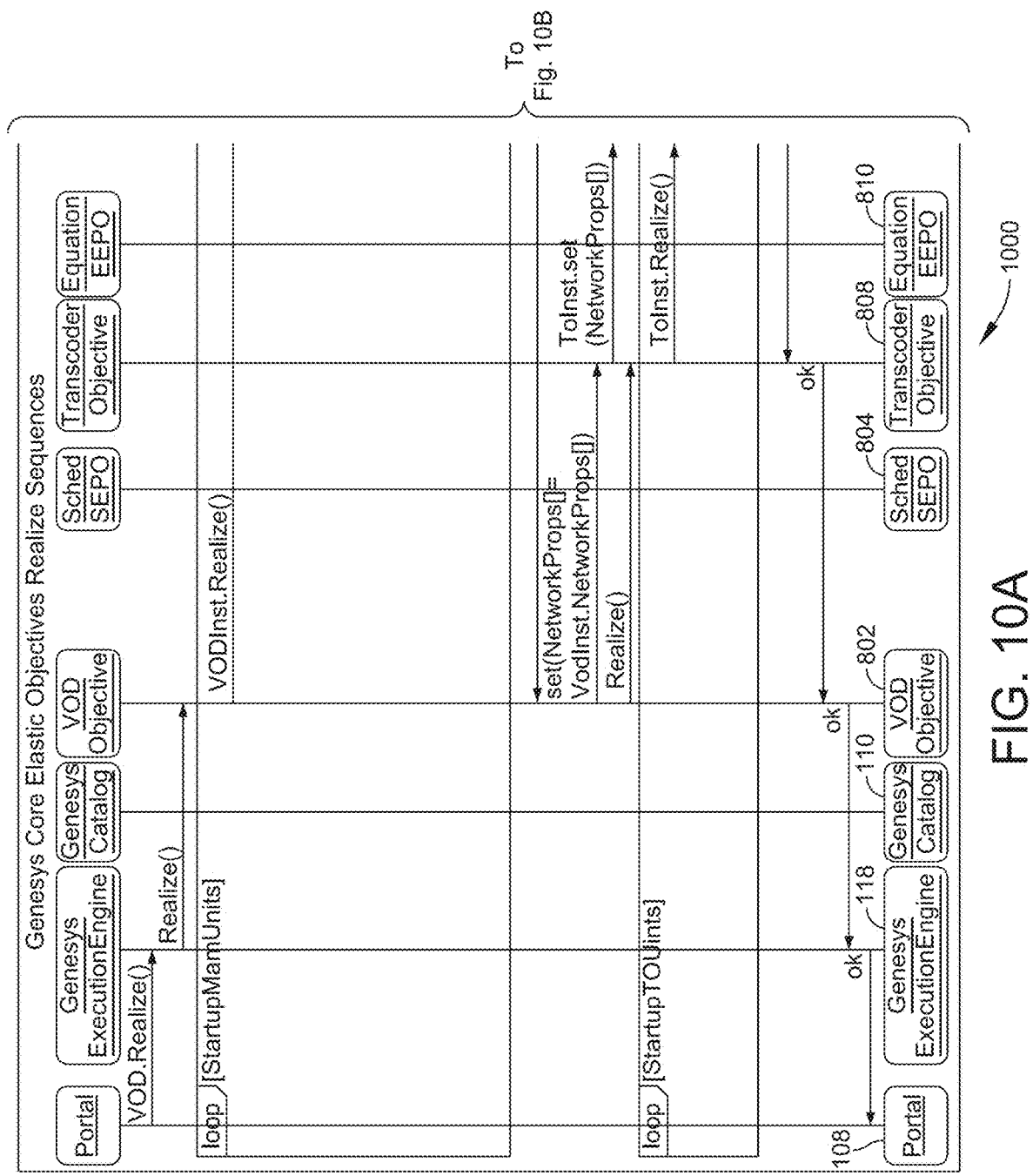
FIGS. 10A and 10B are a sequence diagram illustrating an example realization process.
Figure 10B:
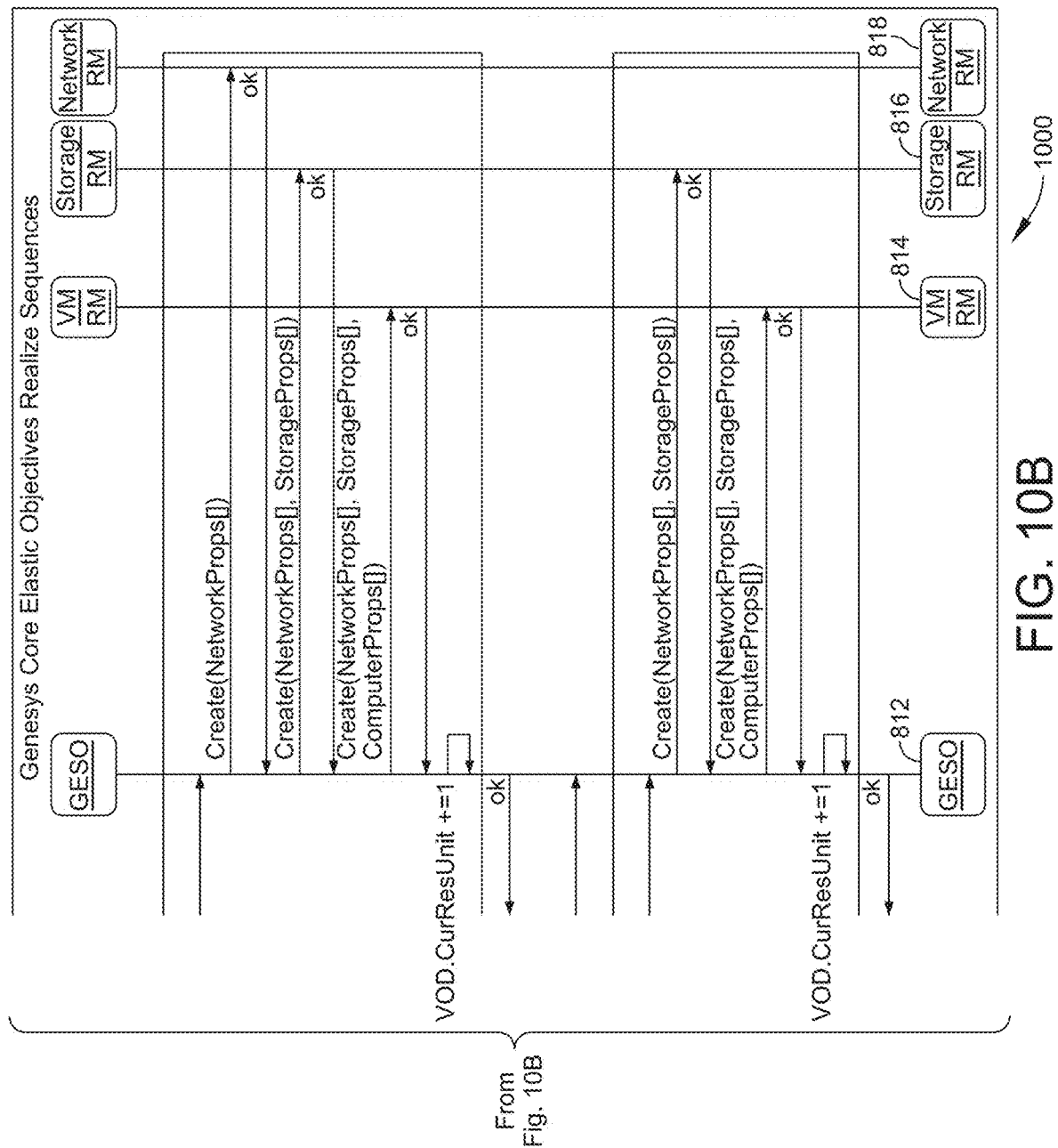

FIGS. 10A and 10B illustrate a realization process 1000 that includes acts executed by various components of the provisioning and management system and the elastic computing infrastructure. More particularly, the realization process 1000 includes acts through which objectives established in the creation process 900 are realized via the elastic computing infrastructure.

As illustrated in FIGS. 10A and 10B, the objective portal receives a request for the VOD objective instance to be realized within the elastic computing infrastructure. In response to receiving this request, the objective portal transmits a request to the execution engine to realize the VOD objective instance. Responsive to receiving this realization request, the execution engine transmits a request to the VOD objective instance to execute its realizing method.

As shown in FIGS. 10A and 10B, in response to receiving this execution request, the VOD objective instance executes its realize method by first transmitting a request to the elastic service objective instance to execute a realize method associated with the VOD objective instance. Responsive to receiving this execution request, the elastic service objective instance transmits a request to the network resource object to execute its create method using default network resource parameters defined in the elastic service objective class. In response to receiving this execution request, the network resource object allocates network resources according to the default network resource parameters and responds with any execution results. Responsive to receiving these execution results, the elastic service objective instance transmits a request to the storage resource object to execute its create method using default storage resource and default network resource parameters defined within the elastic service objective class. In response to receiving this execution request, the storage resource object allocates storage resources according to the default storage resources parameters and the default network resource parameters and responds with any execution results. Responsive to receiving these execution results, the elastic service objective instance transmits a request to the compute resource object to execute its create method using default compute resource parameters, default storage resource parameters, and network resource parameters defined within the elastic service objective class. In response to receiving this execution request, the compute resource object allocates compute resources according to the default compute resource parameters, default storage resource parameters, and default network resource parameters and responds with any execution results. Responsive to receiving these execution results, the elastic service objective instance tracks the amount of logical resource units allocated to the VOD objective instance by incrementing the CurResUnit property of the VOD objective instance and responds to the VOD objective instance with any execution results.

As illustrated in FIGS. 10A and 10B, in response to receiving these execution results, the VOD objective instance continues execution of its realize method by transmitting a request to the transcoder objective instance to set its network resource properties to the network resource properties of the VOD objective instance. Responsive to receiving this configuration request, the transcoder objective instance sets its network resource properties to reference the network resource properties of the VOD objective instance. In this way, the transcoder objective instance references network resources (e.g., network locations) that are shared with the VOD objective instance.

Next, the VOD objective instance continues execution of its realized method by transmitting a request to the transcoder objective instance to execute its realizing method. Responsive to receiving this execution request, the transcoder objective instance executes its realize method by first transmitting a request to the elastic service objective instance to execute a realize method associated with the transcoder objective instance. Responsive to receiving this execution request, the elastic service objective instance transmits a request to the storage resource object to execute its create method using default storage resource and default network resource parameters defined within the elastic service objective class. In response to receiving this execution request, the storage resource object allocates storage resources according to the default storage resources parameters and the default network resource parameters and responds with any execution results. Responsive to receiving these execution results, the elastic service objective instance transmits a request to the compute resource object to execute its create method using default compute resource parameters, default storage resource parameters, and network resource parameters defined within the elastic service objective class. In response to receiving this execution request, the compute resource object allocates compute resources according to the default compute resource parameters, default storage resource parameters, and default network resource parameters and responds with any execution results. Responsive to receiving these execution results, the elastic service objective instance tracks the amount of logical resource units allocated to the transcoder instance by incrementing the CurResUnit property of the transcoder instance and responds to the transcoder objective instance with any execution results. In response to receiving any execution results, the transcoder objective instance responds to the VOD objective instance with any execution results. In response to receiving any execution results, the VOD objective instance responds to the execution engine with any execution results. In response to receiving any execution results, the execution engine responds to the objective portal with any execution results.

Figure 11A:
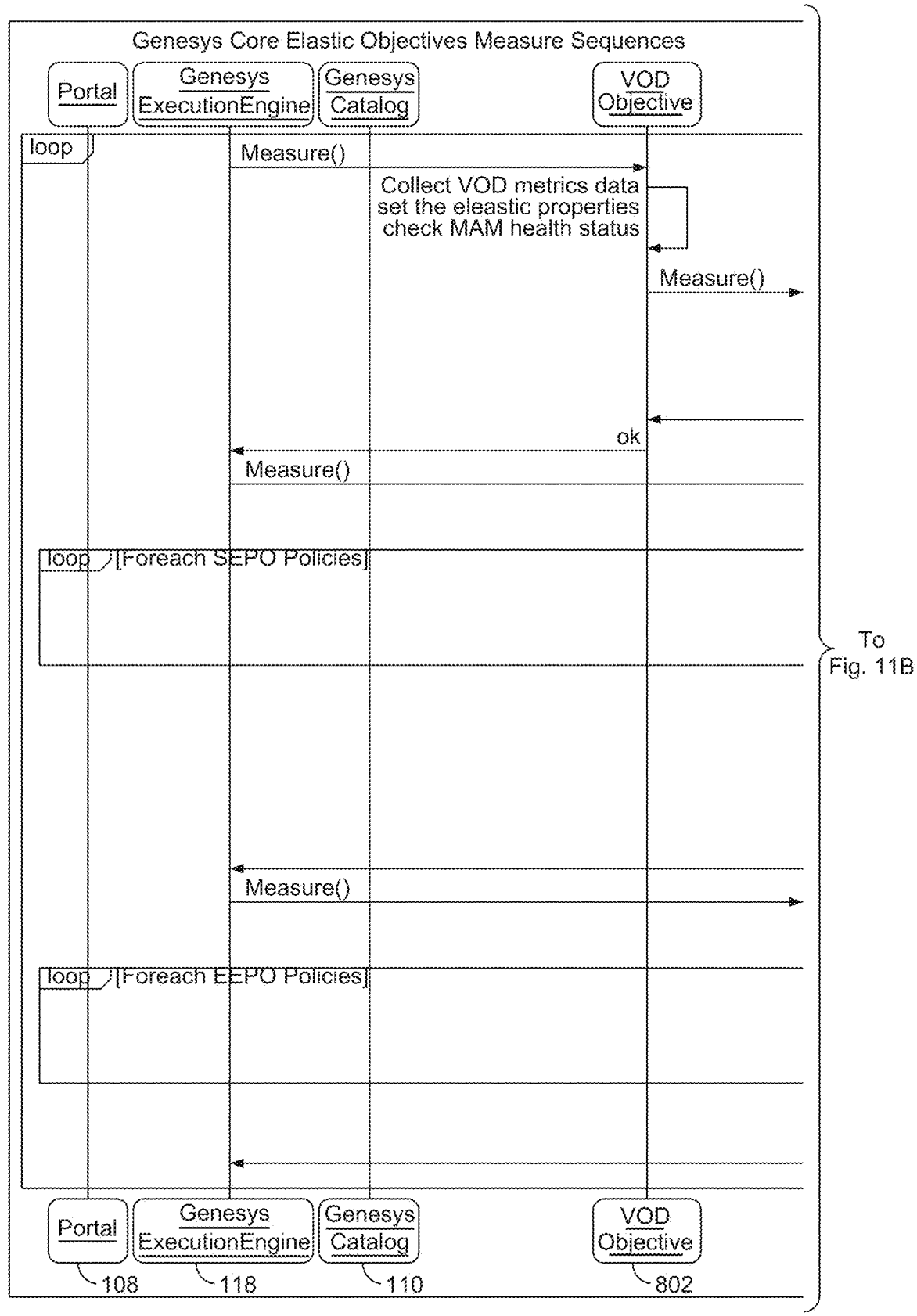
FIGS. 11A, 11B, and 11C are a sequence diagram illustrating an example measurement process.
Figure 11B:
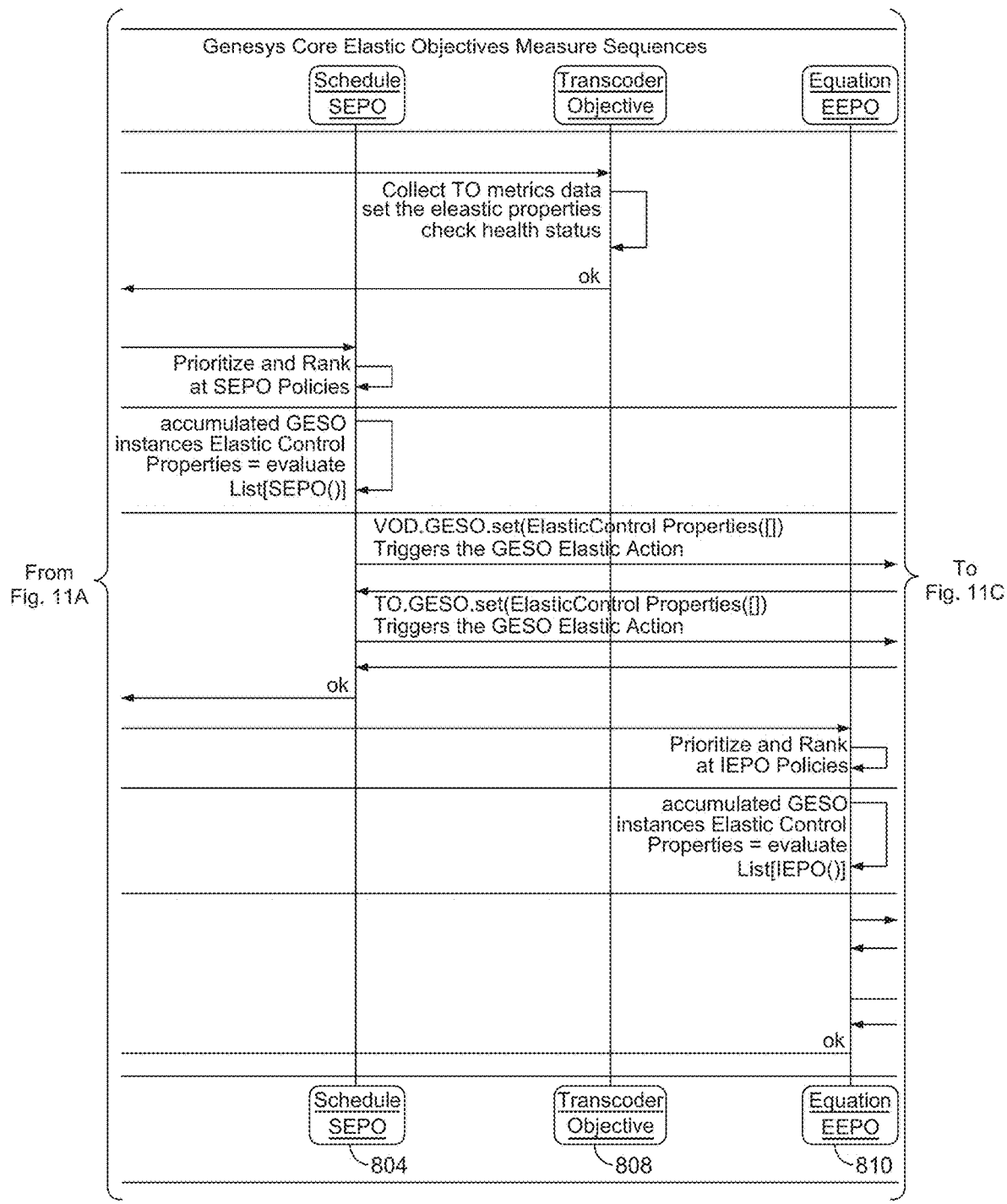
Figure 11C:
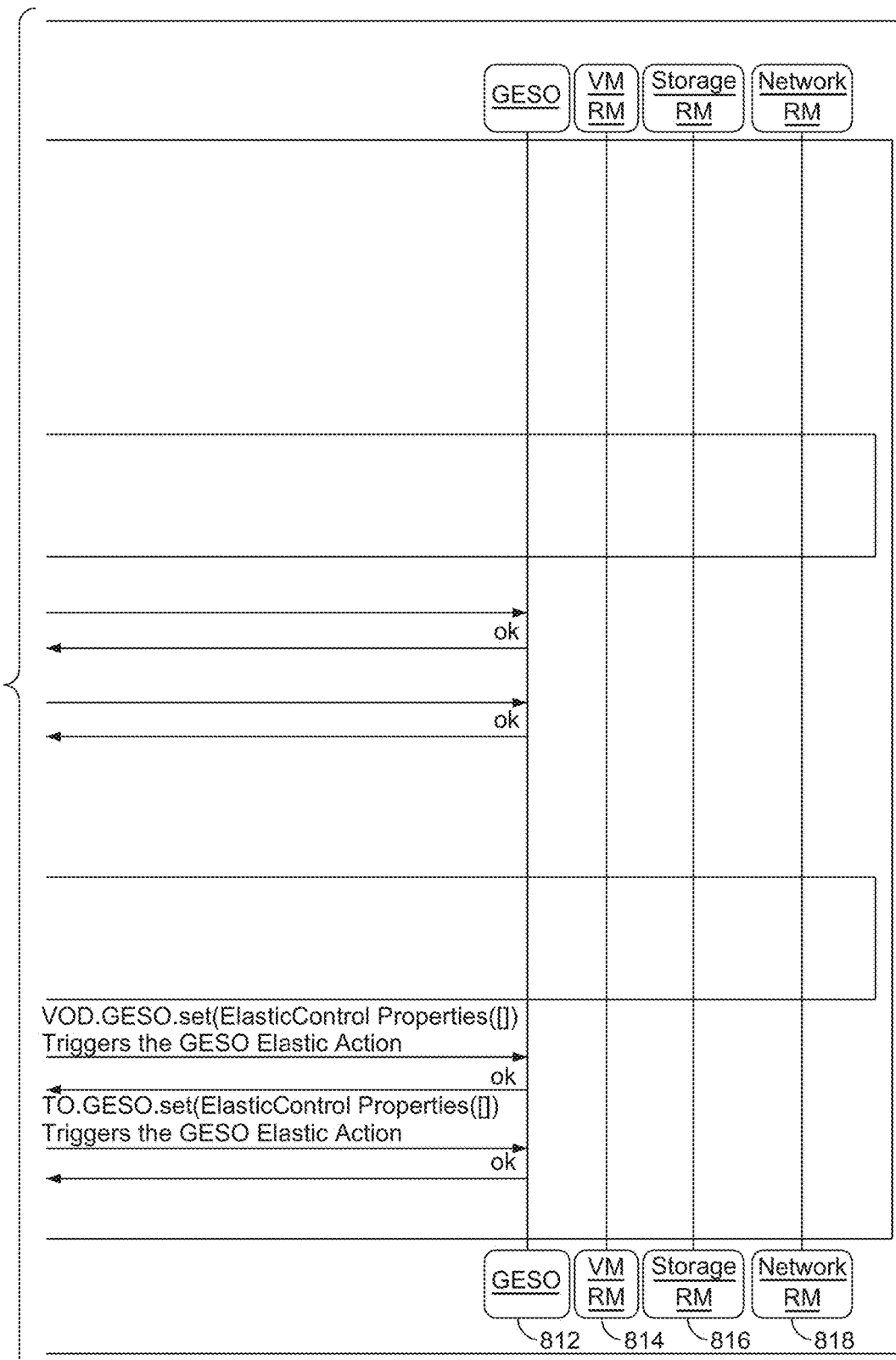

FIGS. 11A, 11B, and 11C illustrate a measurement process 1100 that includes acts executed by various components of the provisioning and management system and the elastic computing infrastructure. More particularly, the measurement process 1100 includes acts through which objectives realized in the realization process 1000 are measured within the elastic computing infrastructure.

As illustrated in FIGS. 11A, 11B, and 11C, the execution engine transmits a request to the VOD objective instance to execute its measure method. In response to receiving this execution request, the VOD objective instance collects VOD metrics descriptive of its operational performance, resource footprint and operational status and transmits a request to the transcoder objective instance to execute its measure method. The VOD metrics descriptive of operational performance may include number of video requests received over a defined time period, number of video streamed over a defined time period, average time elapsed between receipt of a video request and commencing of its streaming, and the like. Responsive to receiving the measure execution request, the transcoder objective instance collects transcoder metrics descriptive of its operational performance, resource footprint and operational status and responds to the VOD objective instance with the transcoder metrics. In response to receiving the transcoder metrics, the VOD objective instance responds to the execution engine with the VOD metrics and the transcoder metrics.

As shown in FIGS. 11A, 11B, and 11C, the execution engine next transmits a request to the schedule SEPO instance to execute its measure method. In response to receiving this execution request, the schedule SEPO instance prioritizes and ranks SEPO policies. Next, for each policy, the schedule SEPO instance calculates the elastic control properties required to support the policy in view of the VOD and transcoder metrics and transmits requests to the elastic service objective instance to allocate resources to the VOD objective instance and the transcoder objective instance in accord with the calculated elastic control properties of the policy. In response to receiving these allocation requests, the elastic service objective processes the allocation requests as described further below with reference to FIGS. 12 and 13. Responsive to receiving responses to the allocation requests, the schedule SEPO instance responds to the execution engine with any execution results.

As illustrated in FIGS. 11A, 11B, and 11C, the execution engine next transmits a request to the equation EEPO instance to execute its measure method. In response to receiving this execution request, the equation EEPO instance prioritizes and ranks EEPO policies. Next, for each policy, the equation EEPO instance calculates the elastic control properties required to support the policy in view of the VOD and transcoder metrics and transmits requests to the elastic service objective instance to allocate resources to the VOD objective instance and the transcoder objective instance in accord with the calculated elastic control properties of the policy. In response to receiving these allocation requests, the elastic service objective processes the allocation requests as described further below with reference to FIGS. 12 and 13. Responsive to receiving responses to the allocation requests, the equation EEPO instance responds to the execution engine with any execution results.

Figure 12A:
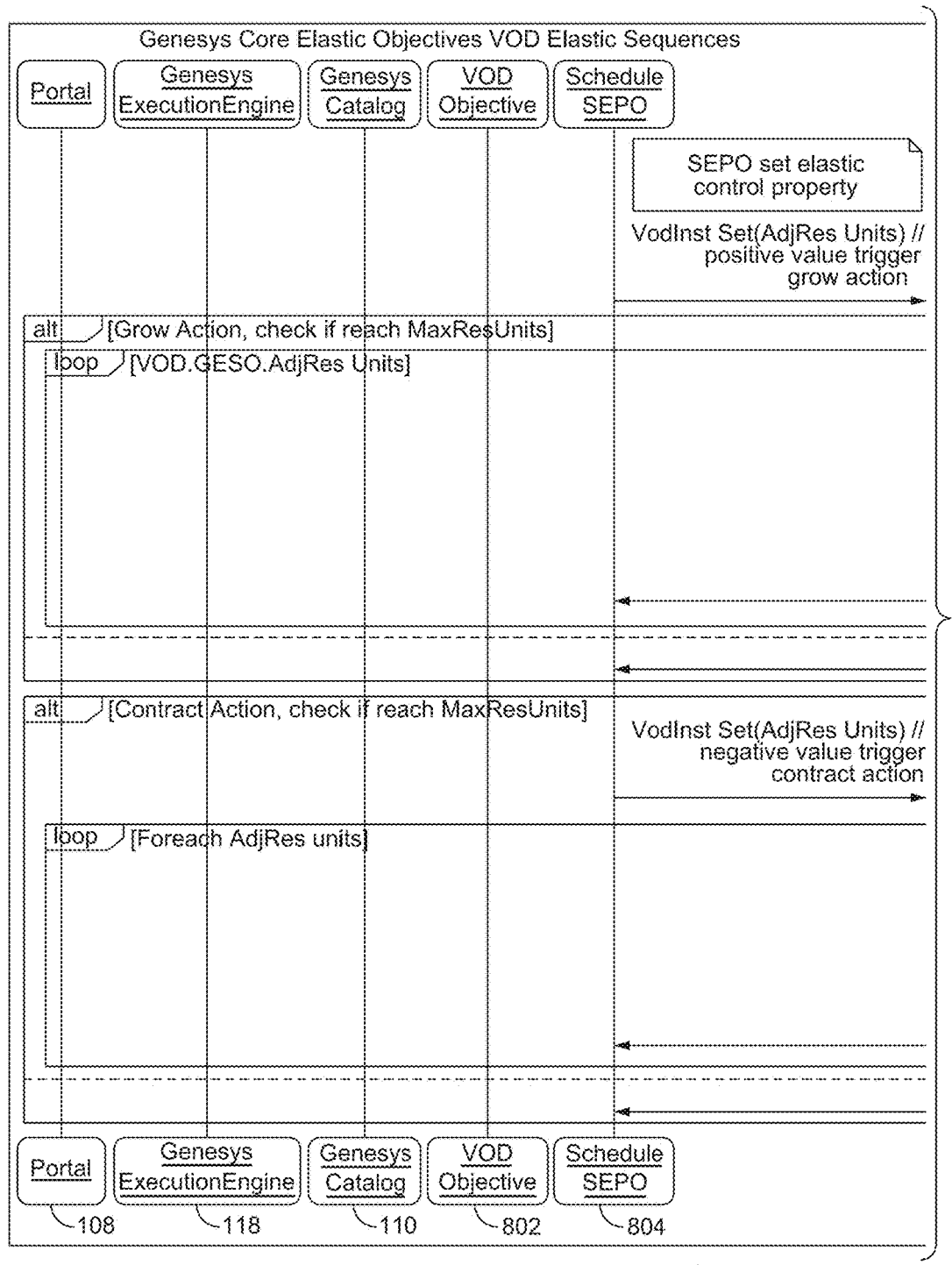
FIGS. 12A and 12B are a sequence diagram illustrating an example allocation process.
Figure 12B:
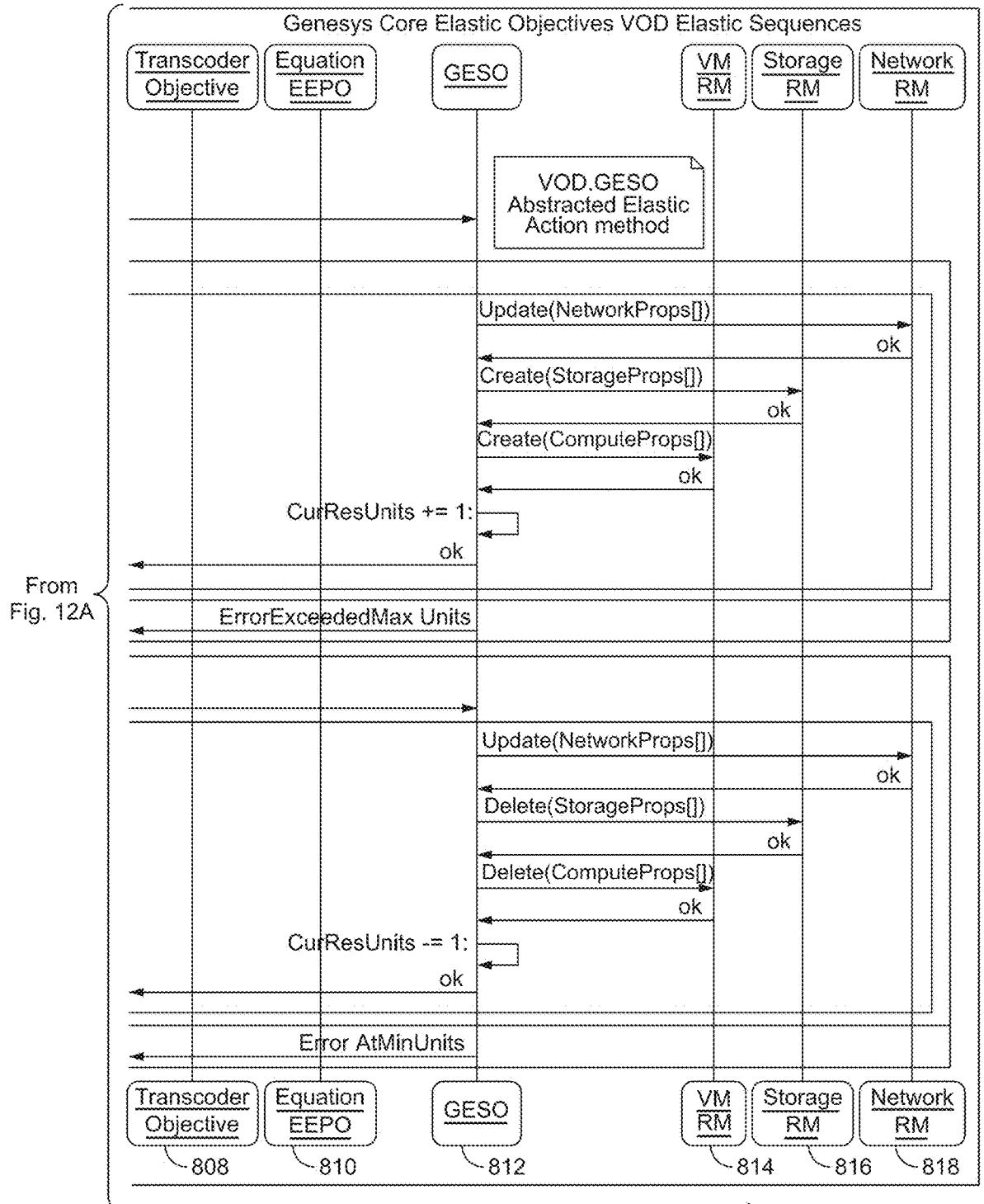

FIGS. 12A and 12B illustrate an allocation process 1200 that includes acts executed by various components of the provisioning and management system and the elastic computing infrastructure. More particularly, the allocation process 1200 includes acts through which resources available to the VOD objective instance measured in the measurement process 1100 are adjusted within the elastic computing infrastructure.

As shown in FIGS. 12A and 12B, the schedule SEPO instance transmits a request to the elastic service objective instance associated with the VOD objective instance to set its AdjResUnits property to a value. Where the value is positive, the elastic service objective instance responds to the set request by executing its grow method. Where the value is negative, the elastic service objective instance responds to the set request by executing its contract method.

In executing its grow method, the elastic service objective instance associated with the VOD objective instance determines whether its CurResUnit value equals its MaxResUnits value. If so, the elastic service objective instance responds to the schedule SEPO instance with results that indicate that the maximum amount of resources are allocated to the VOD objective instance. Otherwise, the elastic service objective instance transmits a request to the network resource object to execute its update method with an increased logical resource unit value. Responsive to receiving this execution request, the network resource object executes its update method with the increased logical resource unit value and responds with any execution results. In response to receiving these execution results, the elastic service objective instance transmits a request to the storage resource object to execute its create method with an increased logical resource unit value. Responsive to receiving this execution request, the storage resource object executes its create method with the increased logical resource unit value and responds with any execution results. In response to receiving these execution results, the elastic service objective instance transmits a request to the compute resource object to execute its create method with an increased logical resource unit value. Responsive to receiving this execution request, the compute resource object executes its create method with the increased logical resource unit value and responds with any execution results. In response to receiving these execution results, the elastic service objective instance tracks the amount of logical resource units allocated to the VOD objective instance by incrementing the CurResUnit property of the VOD objective instance and responds to the schedule SEPO instance with any execution results.

In executing its contract method, the elastic service objective instance associated with the VOD objective instance determines whether its CurResUnit value equals its MinResUnits value. If so, the elastic service objective instance responds to the schedule SEPO instance with results that indicate that the minimum amount of resources are allocated to the VOD objective instance. Otherwise, the elastic service objective instance transmits a request to the network resource object to execute its update method with a decreased logical resource unit value. Responsive to receiving this execution request, the network resource object executes its update method with the decreased logical resource unit value and responds with any execution results. In response to receiving these execution results, the elastic service objective instance transmits a request to the storage resource object to execute its delete method with a decreased logical resource unit value. Responsive to receiving this execution request, the storage resource object executes its delete method with the decreased logical resource unit value and responds with any execution results. In response to receiving these execution results, the elastic service objective instance transmits a request to the compute resource object to execute its delete method with a decreased logical resource unit value. Responsive to receiving this execution request, the compute resource object executes its delete method with the decreased logical resource unit value and responds with any execution results. In response to receiving these execution results, the elastic service objective instance tracks the amount of logical resource units allocated to the VOD objective instance by decrementing the CurResUnit property of the VOD objective instance and responds to the schedule SEPO instance with any execution results.

Figure 13A:
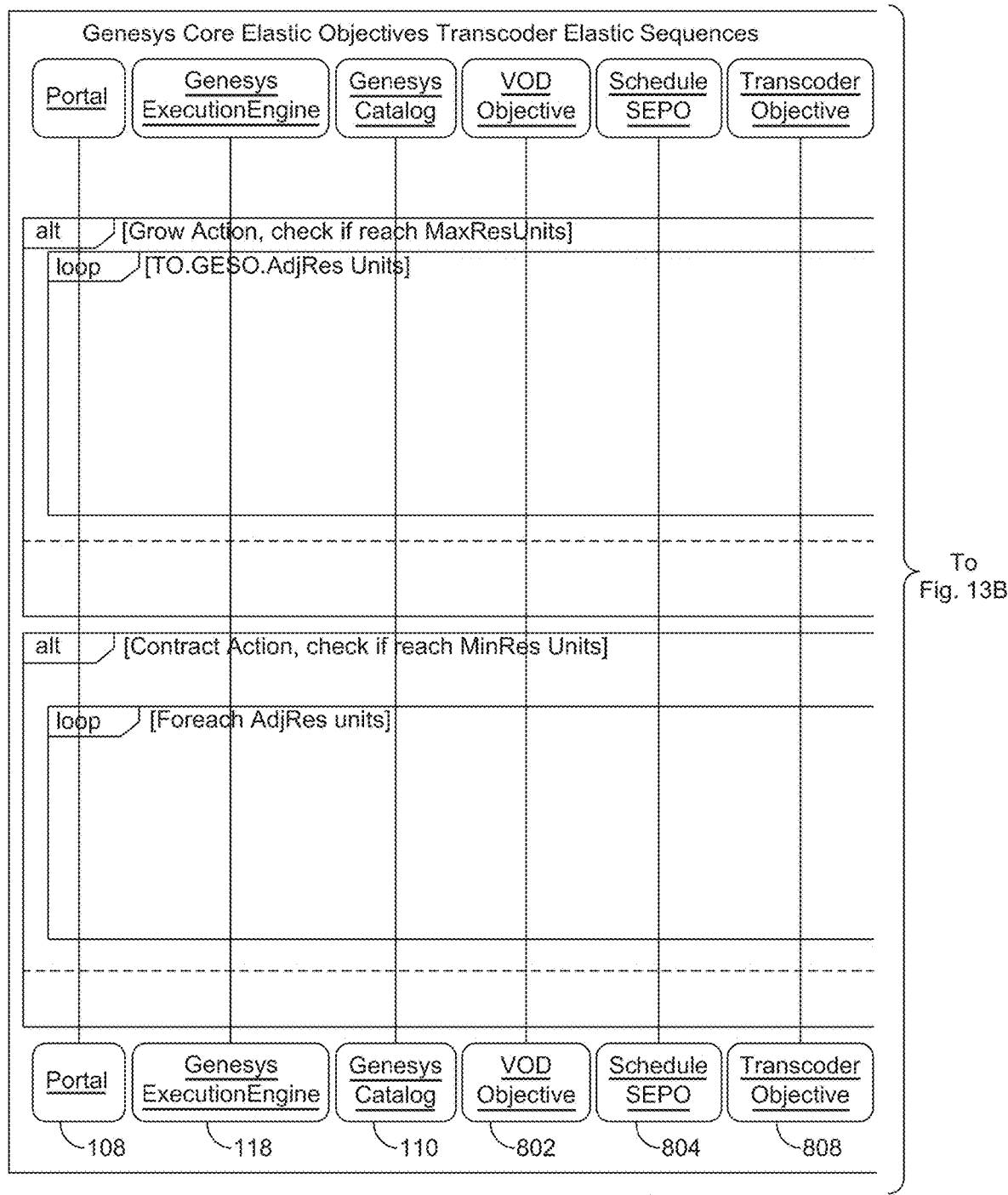
FIGS. 13A and 13B are a sequence diagram illustrating another example allocation process.
Figure 13B:
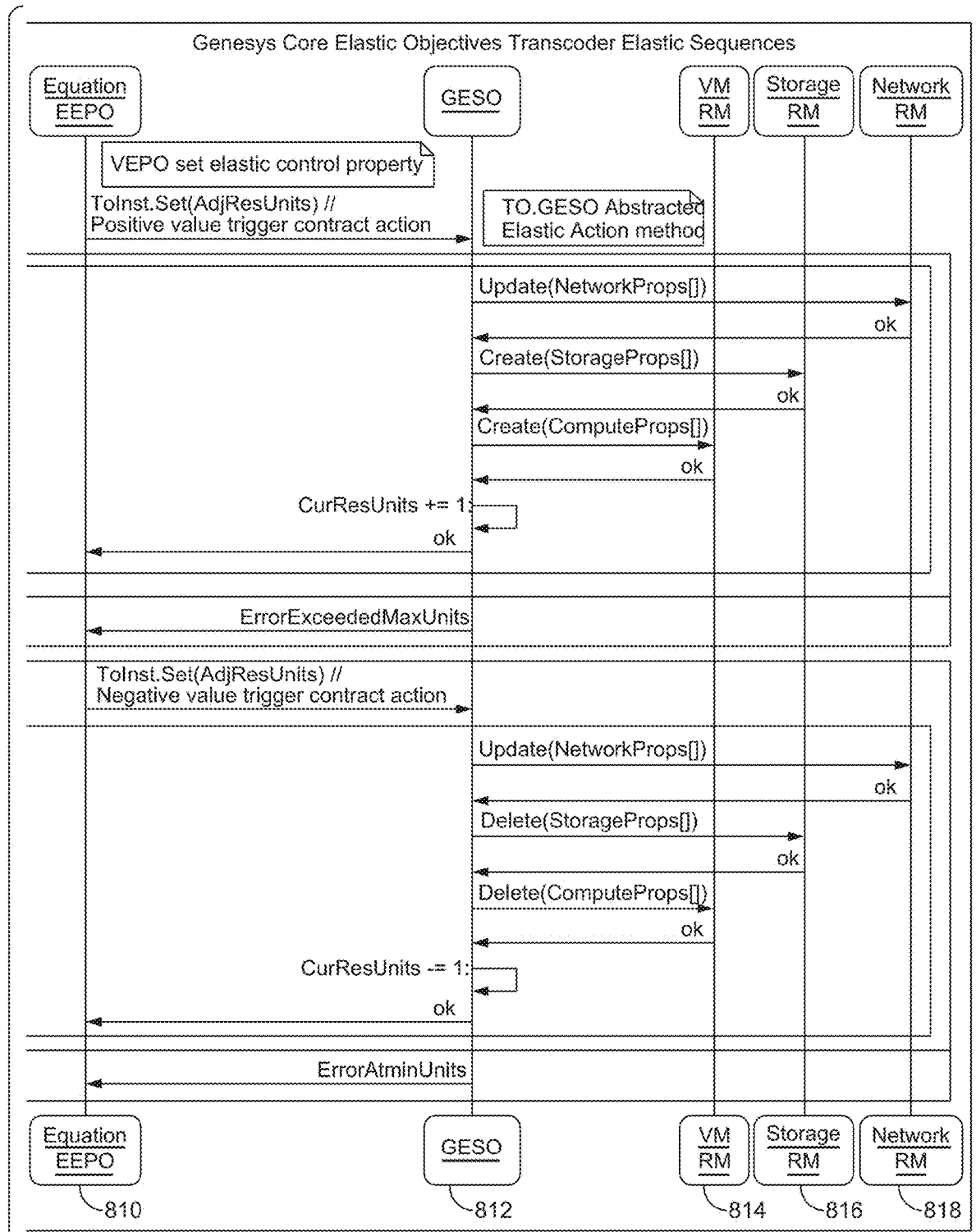

FIGS. 13A and 13B illustrate an allocation process 1300 that includes acts executed by various components of the provisioning and management system and the elastic computing infrastructure. More particularly, the allocation process 1300 includes acts through which resources available to the transcoder objective instance measured in the measurement process 1100 are adjusted within the elastic computing infrastructure.

As shown in FIGS. 13A and 13B, the equation EEPO instance transmits a request to the elastic service objective instance associated with the transcoder objective instance to set its AdjResUnits property to a value. Where the value is positive, the elastic service objective instance responds to the set request by executing its grow method. Where the value is negative, the elastic service objective instance responds to the set request by executing its contract method.

In executing its grow method, the elastic service objective instance associated with the transcoder objective instance determines whether its CurResUnit value equals its MaxResUnits value. If so, the elastic service objective instance responds to the equation EEPO instance with results that indicate that the maximum amount of resources are allocated to the transcoder objective instance. Otherwise, the elastic service objective instance transmits a request to the network resource object to execute its update method with an increased logical resource unit value. Responsive to receiving this execution request, the network resource object executes its update method with the increased logical resource unit value and responds with any execution results. In response to receiving these execution results, the elastic service objective instance transmits a request to the storage resource object to execute its create method with an increased logical resource unit value. Responsive to receiving this execution request, the storage resource object executes its create method with the increased logical resource unit value and responds with any execution results. In response to receiving these execution results, the elastic service objective instance transmits a request to the compute resource object to execute its create method with an increased logical resource unit value. Responsive to receiving this execution request, the compute resource object executes its create method with the increased logical resource unit value and responds with any execution results. In response to receiving these execution results, the elastic service objective instance tracks the amount of logical resource units allocated to the transcoder objective instance by incrementing the CurResUnit of the transcoder objective instance and responds to the equation EEPO instance with any execution results.

In executing its contract method, the elastic service objective instance associated with the transcoder objective instance determines whether its CurResUnit value equals its MinResUnits value. If so, the elastic service objective instance responds to the equation EEPO instance with results that indicate that the minimum amount of resources are allocated to the transcoder objective instance. Otherwise, the elastic service objective instance transmits a request to the network resource object to execute its update method with a decreased logical resource unit value. Responsive to receiving this execution request, the network resource object executes its update method with the decreased logical resource unit value and responds with any execution results. In response to receiving these execution results, the elastic service objective instance transmits a request to the storage resource object to execute its delete method with a decreased logical resource unit value. Responsive to receiving this execution request, the storage resource object executes its delete method with the decreased logical resource unit value and responds with any execution results. In response to receiving these execution results, the elastic service objective instance transmits a request to the compute resource object to execute its delete method with a decreased logical resource unit value. Responsive to receiving this execution request, the compute resource object executes its delete method with the decreased logical resource unit value and responds with any execution results. In response to receiving these execution results, the elastic service objective instance tracks the amount of logical resource units allocated to the transcoder objective instance by decrementing the CurResUnit property of the transcoder objective instance and responds to the equation EEPO instance with any execution results.

Processes 900-1300 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

Example Web Server Objective

In another embodiment, the provisioning and management system configures and manages an elastic computing infrastructure to implement a networked web server objective. In this embodiment, a virtual machine resource, network resources, storage resource, and a web server application resource are organized into the networked web server objective. The networked web server objective type also encapsulates the business logic necessary to configure the individual resources together into a fully functioning web server. This includes all the behaviors necessary to create and orchestrate the constituent resources of the objective into a cohesive service.

In this embodiment, the networked web server objective encapsulates information about the resource demands the objective places on the underlying infrastructure. For instance, the network web server objective requires a virtual machine resource provisioned with a certain amount of memory, a specified CPU speed, number of cores, etc. The networked web server objective also requires a specified amount of storage capacity of a given type and performance. The networked web server objective also requires network resources like VLANs, address space, etc. These resources taken together represent the total requirements of the networked web server objective and can be summarized by the objective as a unit. In addition, the networked web server objective may include information descriptive of a predefined (target) performance level. This information may be used by the web server objective to track and adjust the virtual and physical computing resources allocated to the networked web server objective from the elastic computing infrastructure via an elastic service objective, such as the elastic service objective 812 described above with reference to FIGS. 8-13.

Example Federated Service Provider Objective

Figure 14:
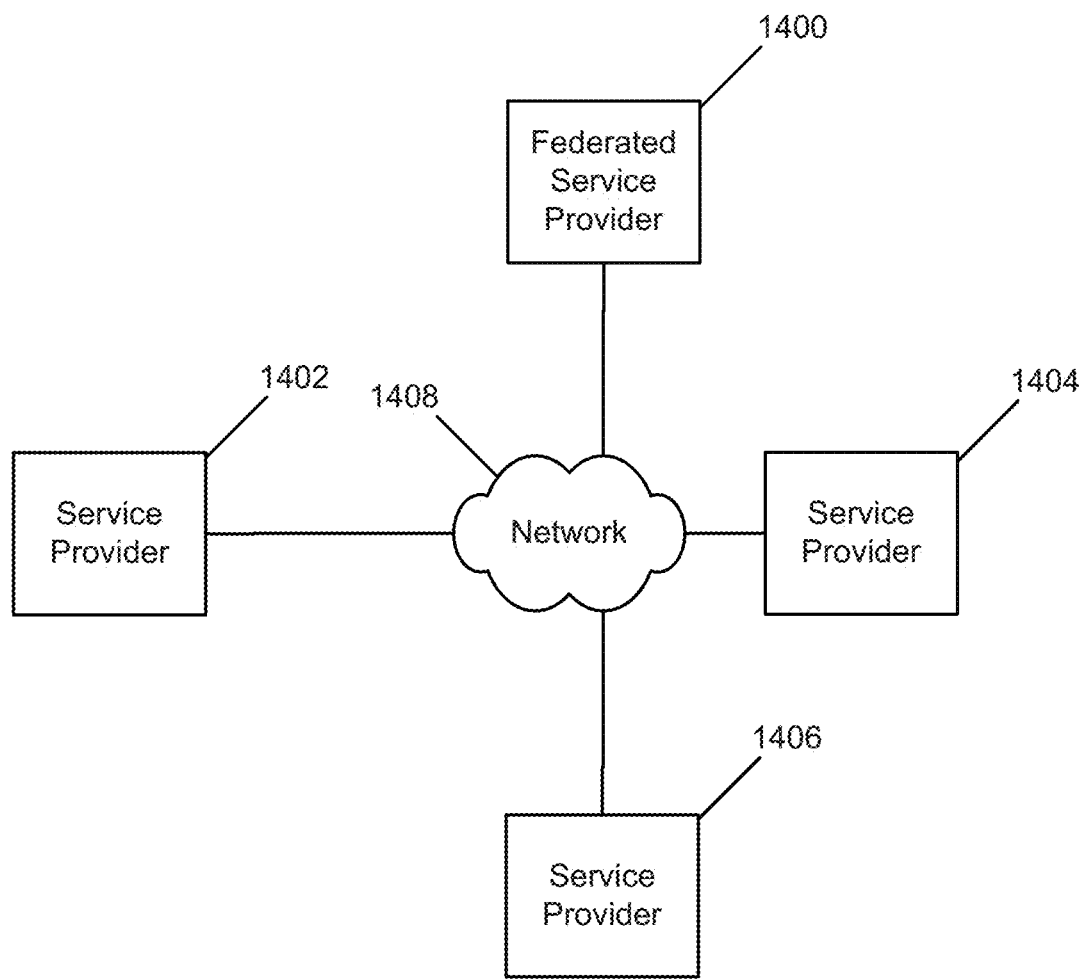
FIG. 14 is a block diagram of a federated service provider system.
Figure 15:
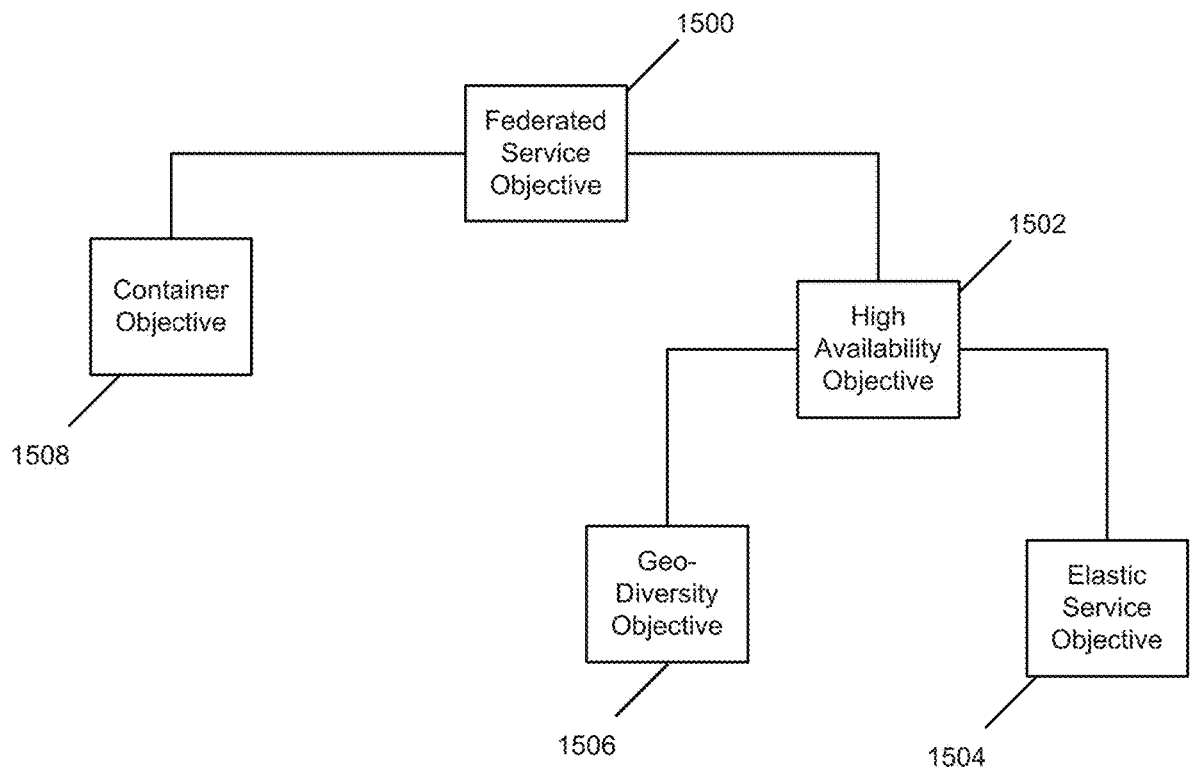
FIG. 15 is a block diagram of a federated service objective.

In other embodiments, the provisioning and management system configures and manages an elastic computing infrastructure to implement and provide a federated service to one or more consumers. FIGS. 14 and 15 illustrate several of these embodiments. FIG. 14 shows a system of physical resources deployed at one or more physical locations. FIG. 15 depicts a set of logical components executing within the system illustrated in FIG. 14.

As shown, FIG. 14 includes a federated service provider 1400, service providers 1402, 1404, and 1406, and a communications network 1410. Each of the federated service provider 1400, the service providers 1402, 1404, and 1406, and the communications network 1410 may include one or more computer systems, such as the computer system described above with reference to FIG. 3. As illustrated in FIG. 14, the federated service provider 1400, and the service providers 1402, 1404, and 1406 are coupled together and exchange (e.g., send or receive) information via the network 1410. The network 1410 may include any communication network through which devices may exchange information. For example, the network 1410 may be a public network, such as the Internet, and may include other public or private networks such as LANs, WANs, extranets, intranets, and cloud computing systems. The network 1410 may also include cellular networks such as CMDA, EvDO, GSM, and iDEN networks.

As shown, FIG. 15 includes a federated service provider objective 1500, a high availability objective 1502, an elastic service objective 1504, a geo-diversity objective 1506, and a container objective 1508. In an embodiment illustrated by FIG. 15, each of these objectives is a descendant of a common objective class, such as the objective class described above with reference to FIG. 5. In addition, as shown in FIG. 15, the federated service provider objective 1500 includes the following objectives as constituents: the high availability objective 1502, the elastic service objective 1504, the geo-diversity objective 1506, and the container objective 1508. The high availability objective 1502 includes the elastic service objective 1504 and the geo-diversity objective 1506 as constituents. In addition to the common properties, methods, and interfaces implemented by each of the objectives illustrated in FIG. 15, each of the objectives also includes one or more specialized properties, methods, or interfaces used to execute specialized processes.

Returning to FIG. 14, the federated service provider 1400 implements a federated service that incorporates and enhances the services offered by one or more of the service providers 1402, 1404, and 1406. For example, in one embodiment, the federated service provider 1400 provisions and manages virtual resources provided by any combination of the service providers 1402, 1404, and 1406 to produce a higher guaranteed service level than the service level provided by any one of the service providers 1402, 1404, 1406 alone. For instance, in some embodiments, the federated service provider 1400 provides virtual resources that are available 99.99999% of the time by utilizing two or more service providers that provide, individually, virtual resources that are available 99.999% of the time.

For example, the service provider 1402 may include Amazon Web Services offered by Amazon Web Services, Inc. of Seattle, Wash., the service provider 1404 may include TERREMARK cloud services offer by Verizon TERREMARK of Miami, Fla., and the service provider 1406 may include physical resources (e.g., one or more datacenters) owned by the consumer of the federated service. In this example, the federated service provider 1400 is configured to execute a provisioning and management system, such as the provisioning and management system 100 described above with reference to FIG. 1. The provisioning and management system executes the federated service objective 1500 (i.e., instantiates the federated service objective 1500, requests that the federated service objective 1500 execute its create method, requests that the federated service objective 1500 execute its realize method, etc.). It is appreciated that the high availability objective 1502 and the elastic service objective 1504 are also executed via the provisioning and management system during execution of the federated service objective 1500 in accord with the teachings provided herein.

Continuing this example, the high availability objective 1502 executes one or more processes depending on the availability model it is configured to manage. These availability models may include a non-redundant model, an active-standby model, an active-passive model, an active-active model, and an active-active-active model, among other availability models.

When executing under a non-redundant model, the high availability objective 1502 acts as a pass-through to the elastic service objective 1504, which in turn, provisions and manages virtual and physical resources using one or more of the service providers 1402, 1404, and 1406. The elastic service objective 1504 may incorporate and further develop the elastic service objective 812 described above with reference to FIG. 8. The capacity of the physical resources provisioned and managed by the elastic service objective 1504 is sufficient to enable delivery of the federated service at a predetermined performance level. However, when executing under a non-redundant model, the high availability objective 1502 does not guarantee virtual resource availability at a level greater than the level provided by the least available of the service providers 1402, 1404, and 1406 utilized by the elastic service provider objective 1504. The non-redundant model provides a low cost implementation that may be upgraded to higher levels of redundancy and availability in the future by changing the configuration of the high availability objective 1502.

When executing under an active-standby model, the high availability objective 1502 requests that to the elastic service objective 1504 provision and manage virtual and physical resources using at least two of the service providers 1402, 1404, and 1406. These virtual and physical resources include an active set of resources and a standby set of resources. The capacity of the physical resources included in the active set is sufficient to enable delivery of the federated service at a predetermined performance level. Likewise, the capacity of the physical resources included in the standby set is sufficient to enable delivery of the federated service at the predetermined performance level. In addition, the high availability objective 1502 requests that physical resources included in the active set not overlap with the physical resources in the standby set.

Under the active-standby model, the active set of resources is provisioned and managed by the federated service objective 1500 to deliver the federated service. The standby set of resources is available for provisioning and management by the federated service objective 1500 within a predetermined latency period. If the federated service objective 1500 determines a fault of sufficient impact exists with the active set (for example, by executing an injected rule object), the federated service objective 1500 provisions and manages the standby set into operation and "swings" the federated service from the active set to the, now operational, standby set. It is appreciated that this swing activity may require modification to firewalls, load balancers, and other network settings.

Because the standby set is not provisioned and synchronized with the active set, the standby set may be used for other processing, thus decreasing the cost of the active-standby model relative to other availability models that utilize redundant physical resources. Thus, the active-standby model provides a basic level of redundancy and failover if the active set of resources suffers an outage. However, the overall benefit to availability of the federated service is hampered by the latency period and time required to make the standby set of resources operational.

When executing under an active-passive model, the high availability objective 1502 requests that to the elastic service objective 1504 provision and manage virtual and physical resources using at least two of the service providers 1402, 1404, and 1406. These virtual and physical resources include an active set of resources and a passive set of resources. The capacity of the physical resources included in the active set is sufficient to enable delivery of the federated service at a predetermined performance level. Likewise, the capacity of the physical resources included in the passive set is sufficient to enable delivery of the federated service at the predetermined performance level. In addition, the high availability objective 1502 requests that physical resources included in the active set not overlap with the physical resources in the passive set.

Under the active-passive model, the active set of resources is provisioned and managed by the federated service objective 1500 to deliver the federated service. The passive set of resources is at least partially provisioned and managed by the federated service objective 1500, with the remainder of the provisioning and management being able to be completed within a predetermined latency period. For example, in at least one embodiment, data stored within the active set of resources is periodically synchronized with data stored in the passive set of resources to decrease the duration of the latency period. If the federated service objective 1500 determines a fault of sufficient impact exists with the active set (for example, by executing an injected rule object), the federated service objective 1500 fully provisions and manages the passive set into operation and "swings" the federated service from the active set to the, now fully operational, passive set. It is appreciated that this swing activity may require modification to firewalls, load balancers, and other network settings.

Because the passive set is not fully provisioned, the passive set may be used for other processing, thus decreasing the cost of the active-passive model relative to some other availability models that utilize redundant physical resources. Thus, the active-passive model provides a moderate level of redundancy and failover if the active set of resources suffers an outage. However, the overall benefit to availability of the federated service is still hampered by the latency period and time required to make the passive set of resources fully operational.

When executing under an active-active model, the high availability objective 1502 requests that to the elastic service objective 1504 provision and manage virtual and physical resources using at least two of the service providers 1402, 1404, and 1406. These virtual and physical resources include a primary set of resources and a secondary set of resources. The capacity of the physical resources included in the primary set is sufficient to enable delivery of the federated service at a predetermined performance level. Likewise, the capacity of the physical resources included in the secondary set is sufficient to enable delivery of the federated service at the predetermined performance level. In addition, the high availability objective 1502 requests that physical resources included in the primary set not overlap with the physical resources in the secondary set.

Under the active-active model, the primary set of resources is provisioned and managed by the federated service objective 1500 to deliver the federated service. The secondary set of resources is also fully provisioned and managed by the federated service objective 1500. In addition, the primary set and secondary set are synchronized with one another and each delivers the federated service to the one or more consumers of the federated service. Because both the primary set and the secondary set are fully provisioned, managed, synchronized, and operational, neither may be used for other processing. However, given delivery of the federated service by distinct sets of resources, with each distinct set providing the federated service at the predetermined performance level, the active-active model provides complete redundancy of the federated service. In this way, the active-active model creates a federated service with availability that is superior to the availability of its constituent services.

When executing under an active-active-active model, the high availability objective 1502 requests that to the elastic service objective 1504 provision and manage virtual and physical resources using at least three of the service providers 1402, 1404, and 1406. These virtual and physical resources include a primary set of resources, a secondary set of resources, and a tertiary set of resources. The capacity of the physical resources included in the primary set is sufficient to enable delivery of the federated service at a predetermined performance level. Likewise, the capacity of the physical resources included in the secondary set is sufficient to enable delivery of the federated service at the predetermined performance level. Moreover the capacity of the physical resources included in the tertiary set is sufficient to enable delivery of the federated service at the predetermined performance level. In addition, the high availability objective 1502 requests that physical resources included in the primary set, the secondary set, and the tertiary set do not overlap with one another.

Under the active-active-active model, the primary set of resources is provisioned and managed by the federated service objective 1500 to deliver the federated service. The secondary set of resources is also fully provisioned and managed by the federated service objective 1500. The tertiary set of resources is also fully provisioned and managed by the federated service objective 1500. In addition, the primary set, secondary set, and the tertiary set are synchronized with one another and each delivers the federated service to the one or more consumers of the federated service. Because the primary set, the secondary set, and the tertiary set are each fully provisioned, managed, synchronized, and operational, none may be used for other processing. However, given delivery of the federated service by distinct sets of resources, with each distinct set providing the federated service at the predetermined performance level, the active-active-active model provides complete redundancy of the federated service. In this way, the active-active model creates a federated service with availability that is superior to the availability of its constituent services. In fact, the active-active-active model provides for redundancy and failover even during upgrade and other maintenance activities.

In some embodiments, the federated service provider 1400 is configured to enlist each service provider, such as any one of the service providers 1402, 1404, and 1406, based on the geographic location of physical resources utilized by the service provider. For example with reference FIG. 14, the service provider 1402 may include physical resources located on the east coast of the United States, the service provider 1404 may include physical resources located on the west coast of the United States, and the service provider 1406 may include physical resources located in Western Australia. According to at least one embodiment, the federated service provider may enroll any two or more of the service providers 1402, 1404, and 1406 to establish a geo-diverse physical resource base. In this manner, the federated service provider 1400 provides an increased level of protection against outages than any one of the service providers 1402, 1404, and 1406 can provide alone.

For example, returning to FIG. 15, during execution of the federated service objective 1500, the provisioning and management system also executes the geo-diversity objective 1506 in accord with the teachings provided herein. More particularly, the high availability objective 1502 may inject the geo-diversity objective 1506 when determining which service provider of the service providers 1402, 1404, and 1406 should be provisioned and managed by the elastic service objective 1504. Where the geo-diversity objective is configured to, for example, ensure geo-diversity within the U.S., the geo-diversity objective identifies 1402 and 1404 as target service providers for the elastic service objective. Where the geo-diversity objective is configure to, for example, ensure international geo-diversity, the geo-diversity objective identifies, at least, service provider 1406 and at least one of service providers 1402 and 1404. In an embodiment in accord with FIG. 15, after service providers in compliance with the geo-diversity objective 1506 have been identified, the elastic service objective 1504 provisions and manages the identified service providers according to the instructions of the high availability objective 1502. In this way, the federated service objective 1500 provides geo-diverse virtual and physical resources to implement the federated service.

In some embodiments, the federated service provider 1400 is configured to establish distinct containers for individual consumers of the federated service. Each of these containers may include virtual and physical resources provided by the service providers 1402, 1404, and 1406 that are allocated to an identified consumer. In these embodiments, the containers are secured together to create a private environment for the identified consumer. As each container may provide a consumer with a distinct federated service, each container may span more than one service provider.

For example, returning to FIG. 15, during execution of the federated service objective 1500, the provisioning and management system also executes the container objective 1508 in accord with the teachings provided herein. In some embodiments, the container objective 1508 provides network isolation, firewall isolation, and access control for each container in isolation from other containers, thereby providing the consumer with an individualized version of the federated service. In addition, the container objective 1508 initializes the configuration of each container with respect to the accessibility model utilized by the high availability objective 1502 with the container and the geo-diversity objectives instantiated within the container.

Example Play to Air Service

In some embodiments in accord with FIGS. 14 and 15, the federated service is an play to air service. In these embodiments, each container is dedicated to one or more channels programmed by a consumer. Upon execution of the federated service objective 1500 by the provisioning and management system executing on the federated service provider 1400, the federated service objective 1500 executes the container objective 1508. The container objective 1508 creates a container for each consumer. Next, the federated service objective 1500 executes the high availability objective 1502 with the configuration of each container. The high availability objective 1502, in turn, executes the geo-diversity objective 1506 and the elastic service objective 1504 to create an individual environment within each container according to the configuration within the container. Depending on the configuration of any given container, the container may have allocated a geo-diverse, highly available play to air service or a non-redundant, relatively low availability play to air service.

Figure 16:
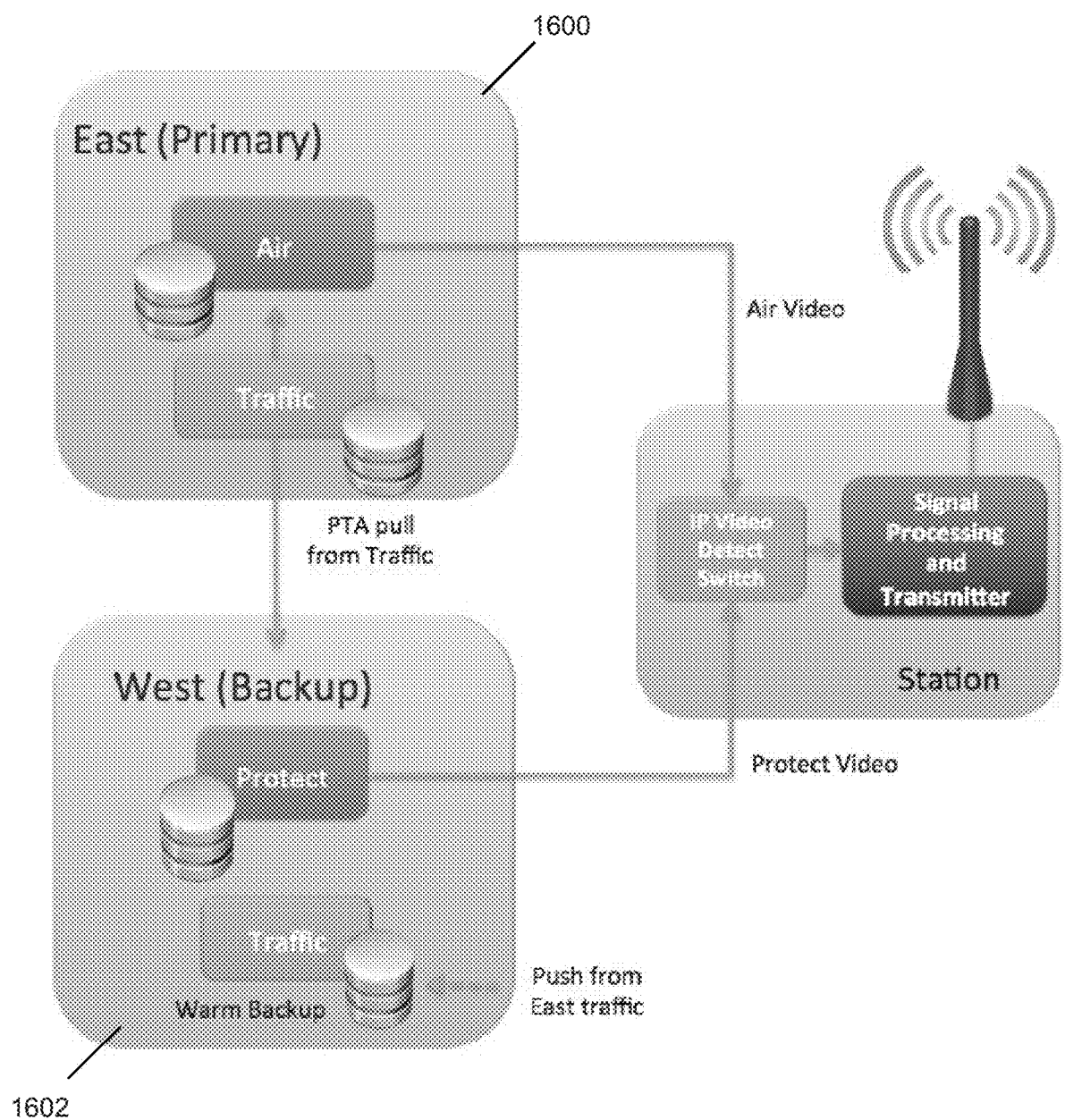
FIG. 16 is a schematic diagram of an play to air service provisioned and managed by a provisioning and management system as illustrated in FIG. 1.

For instance, FIG. 16 illustrates a relatively highly available, geo-diverse play to air container provisioned and managed by the provisioning and management system that is executed by the federated service provider 1400. As shown, FIG. 16 includes a primary set of resources 1600 and a secondary set of resources 1602.

In this example, the configuration of the container has caused the federated service objective 1500 to be configured the high availability objective 1502 to utilize an active-active accessibility model. In addition, in this example, configuration of the container has caused the federated service objective to execute a geo-diversity objective 1506 that calls for a geo-diverse configuration within the U.S. Accordingly, the high availability objective has request that the elastic service objective provision and manage the service provider 1402 (which corresponds to the primary set of resources 1600) and the service provider 1404 (which corresponds to the second set of resources 1602).

As illustrated in FIG. 16, the elastic service objective 1504 has provisioned the primary set of resources 1600 with data storage configured to store programs and advertisements (traffic). Similarly, the elastic service objective 1504 has provisioned the secondary set of resources with data storage configured to store programs and advertisements (traffic). Additionally, as shown in FIG. 16, the elastic service objective 1504 has established database replication between the data storage in the primary set and the secondary set and has established IP connectivity between an IP video/audio switch owned by the consumer and both the primary set of resources 1600 and secondary set of resources 1602. Thus, in the example illustrated in FIG. 16, the consumer is provided with two active IP video/audio signals, either of which may be broadcast by the signal processing and transmitter arrangement owned by the consumer.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A provisioning and management system comprising:
   a memory;
   at least one processor coupled to the memory; and
   a management component executable by the at least one processor and configured to instantiate a plurality of objects, each object of the plurality of objects having an inherited set of properties and methods in common, the plurality of objects comprising
      a plurality of resource objects each configured to control at least one capacity of at least one resource, the at least one resource being one or more of a physical resource and virtual resource of at least one computer system, and
      a high availability object configured to
         request that an active set of resources controlled by an active set of resource objects of the plurality of resource objects be physically distinct from one or more other sets of resources controlled by one or more other sets of resource objects of the plurality of resource objects,
         detect an outage within the active set of resources controlled by the active set of resource objects of the plurality of resource objects, and
         failover to the one or more other sets of resources controlled by the one or more other sets of resource objects of the plurality of resource objects, the one or more other sets of resources being one or more of active resources, passive resources, and standby resources.

2. The provisioning and management system according to claim 1, wherein each resource object of the plurality of resources objects belongs to a domain selected from a group comprising a storage domain, a network domain, and a compute domain.

3. The provisioning and management system according to claim 2, wherein the management component is further configured to instantiate a new resource object of a domain other than the storage domain, the network domain, and the compute domain.

4. The provisioning and management system according to claim 3, wherein the new resource object is configured to expose an interface to receive requests to discover one or more of a new method and a new property.

5. The provisioning and management system according to claim 1, wherein the high availability object and the plurality of resource objects are instances of descendants of a resource type class.

6. The provisioning and management system according to claim 1, wherein the management component is further configured to instantiate a new objective object having a new resource collection including the high availability object.

7. The provisioning and management system according to claim 6, wherein the management component is further configured to model execution of the new objective object prior to instantiating the new objective object.

8. The provisioning and management system according to claim 1, wherein the at least one resource includes at least one network resource, at least one storage resource, and at least one compute resource.

9. The provisioning and management system according to claim 7, wherein at least one resource object of the plurality of resource objects is configured to adjust capacity of one or more resources in increments of actual capacity determined as a function of logical resource units.

10. The provisioning and management system according to claim 9, wherein the management component is further configured to identify one or more components of the at least one computer system involved in providing the one or more resources as controlled by the at least one resource object.

11. A method for provisioning and managing a computing infrastructure, the method comprising:
    instantiating a plurality of objects, each object of the plurality of objects having an inherited set of properties and methods in common, the plurality of objects comprising a plurality of resource objects each configured to control at least one capacity of at least one resource, the at least one resource being one or more of a physical resource and virtual resource of at least one computer system, and
       a high availability object configured to
          request that an active set of resources controlled by an active set of resource objects of the plurality of resource objects be physically distinct from one or more other sets of resources controlled by one or more other sets of resource objects of the plurality of resource objects,
          detect an outage within the active set of resources controlled by the active set of resource objects of the plurality of resource objects, and failover to
       the one or more other sets of resources controlled by the one or more other sets of resource objects of the plurality of resource objects, the one or more other sets of resources being one or more of active resources, passive resources, and standby resources;
    requesting, via execution of the high availability object, that the active set of resources be physically distinct from the one or more other sets of resources;
    detecting, via execution of the high availability object, the outage; and
    failing over to the one or more other sets of resources.

12. The method according to claim 11, wherein instantiating the plurality of objects includes instantiating a plurality of resource objects belonging to a domain selected from a group comprising a storage domain, a network domain, and a compute domain.

13. The method according to claim 12, further comprising instantiating a new resource object of a domain other than the storage domain, the network domain, and the compute domain.

14. The method according to claim 13, wherein instantiating the new resource object includes instantiating a new resource object that exposes an interface to receive requests to discover one or more of a new method and a new property.

15. The method according to claim 14, further comprising modeling execution of the new objective object prior to instantiating the new objective object.

16. A non-transitory computer readable medium storing computer executable instructions for provisioning and managing an elastic computing infrastructure, the computer executable instructions including instructions that instruct at least one processor to: instantiate a plurality of objects, each object of the plurality of objects having an inherited set of properties and methods in common, the plurality of objects comprising
    a plurality of resource objects each configured to control at least one capacity of at least one resource, the at least one resource being one or more of a physical resource and virtual resource of at least one computer system, and
    a high availability object configured to
        request that an active set of resources controlled by an active set of resource objects of the plurality of resource objects be physically distinct from one or more other sets of resources controlled by one or more other sets of resource objects of the plurality of resource objects,
        detect an outage within the active set of resources controlled by the active set of resource objects of the plurality of resource objects, and
        failover to the one or more other sets of resources controlled by the one or more other sets of resource objects of the plurality of resource objects, the one or more other sets of resources being one or more of active resources, passive resources, and standby resources.

17. The provisioning and management system of claim 1, wherein the active set of resources and each set of the one or more other sets of resources respectively have capacity sufficient to provide a service at a predetermine performance level.

18. The provisioning and management system of claim 17, wherein the one or more other sets of resources comprise a plurality of sets of resources.

* * * * *